US012387215B2

(12) United States Patent
Hassanzadeh et al.

(10) Patent No.: US 12,387,215 B2
(45) Date of Patent: Aug. 12, 2025

(54) PRIVACY-PRESERVING COLLABORATIVE MACHINE LEARNING TRAINING USING DISTRIBUTED EXECUTABLE FILE PACKAGES IN AN UNTRUSTED ENVIRONMENT

(71) Applicant: Accenture Global Solutions Limited, Dublin (IE)

(72) Inventors: Amin Hassanzadeh, Arlington, VA (US); Neil Hayden Liberman, Arlington, VA (US); Aolin Ding, Piscataway, NJ (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 1086 days.

(21) Appl. No.: 17/356,447

(22) Filed: Jun. 23, 2021

(65) Prior Publication Data
US 2022/0414661 A1 Dec. 29, 2022

(51) Int. Cl.
*G06Q 20/40* (2012.01)
*G06N 3/04* (2023.01)
(Continued)

(52) U.S. Cl.
CPC .......... *G06Q 20/4016* (2013.01); *G06N 3/04* (2013.01); *G06N 3/08* (2013.01); *G06N 20/00* (2019.01)

(58) Field of Classification Search
CPC ........ G06Q 20/4016; G06N 3/04; G06N 3/08; G06N 20/00; G06N 3/063; G06N 3/084; G06N 3/098
See application file for complete search history.

(56) References Cited

U.S. PATENT DOCUMENTS

2020/0005187 A1* 1/2020 Bendre .................. H04L 67/60
2023/0019669 A1* 1/2023 Alabbasi ................ H04L 41/16

OTHER PUBLICATIONS

Yang, Wensi, et al. "Ffd: A federated learning based method for credit card fraud detection." Big Data—Big Data 2019: 8th International Congress, Held as Part of the Services Conference Federation, SCF 2019, San Diego, CA, USA, Jun. 25-30, 2019, Proceedings 8. Springer International Publishing, 2019. (Year: 2019) https://link.springer.com/chapter/10.1007/978-3-030-23551-2_2.*

(Continued)

*Primary Examiner* — Kakali Chaki
*Assistant Examiner* — Michael H Hoang
(74) *Attorney, Agent, or Firm* — Seed Intellectual Property Law Group LLP

(57) ABSTRACT

Aspects of the present disclosure provide systems, methods, and computer-readable storage media that support cooperative training of machine learning (ML) models that preserves privacy in untrusted environments using distributed executable file packages. The executable file packages may include files, libraries, scripts, and the like that enable a cloud service provider configured to provide server-side ML model training to also support cooperative ML model training with multiple clients, particularly for a fraud prediction model for financial transactions. Because the cooperative training includes the clients training respective ML models and the server aggregating the trained ML models, private client data such as financial transaction data may be used to train the fraud prediction model without exposing the client data to others. Such cooperative ML model training enables offloading of computing resource-intensive training from client devices to the server and may train a more robust fraud detection model.

15 Claims, 7 Drawing Sheets

(51) Int. Cl.
*G06N 3/08* (2023.01)
*G06N 20/00* (2019.01)

(56) References Cited

OTHER PUBLICATIONS

Thapa C, Chamikara MA, Camtepe SA. Advancements of federated learning towards privacy preservation: from federated learning to split learning. Federated Learning Systems: Towards Next-Generation AI. 2021:79-109. https://link.springer.com/chapter/10.1007/978-3-030-70604-3_4 (Year: 2021).*

Jansson, Madeleine, and Mans Axelsson. "Federated learning used to detect credit card fraud." LU-CS-EX (2020). https://lup.lub.lu.se/luur/download?func=downloadFile&recordOId=9024753&fileOId=9024763 (Year: 2020).*

* cited by examiner

PRIVACY-PRESERVING COLLABORATIVE MACHINE LEARNING TRAINING USING DISTRIBUTED EXECUTABLE FILE PACKAGES IN AN UNTRUSTED ENVIRONMENT

TECHNICAL FIELD

The present disclosure relates generally to cooperative training of machine learning (ML) models that preserves privacy in an untrusted environment. The techniques described herein may leverage third party cloud services to support collaborative training of a fraud detection machine learning model by multiple financial institutions using distributed executable file packages.

BACKGROUND

Machine learning (ML) and artificial intelligence (AI) are increasingly being leveraged in a variety of technologies to efficiently automate the performance of a variety of tasks. For example, computing devices have been configured to utilize ML and AI to forecast time series data, to identify and predict anomalies, to categorize digital images or video, to perform automatic speech recognition, to perform natural language processing, and the like. Coupled with the advance of deep learning (DL), a very noticeable trend is that ML models heavily rely on large-scale datasets and intensive computing resources. When facing distributed networks and highly sensitive datasets (e.g., finance, healthcare, etc.), conventional central-cloud ML infrastructures impose unique challenges due to their centralized system designs. In order to configure ML models, such as neural networks (NNs), the ML models are designed to have an initial structure and are then trained, using training data, to perform a target task. Depending on the size and complexity of the ML model and the target task to be performed, such training can be significantly expensive in terms of computational resources. To support use of ML techniques in less powerful devices, such as some wireless devices (e.g., mobile phones, Internet of Things (IoT) devices, and like), training of ML models may be performed at a computing device with a large amount of computational resources, such as a server or one or more cloud-based processing devices. For example, cloud service providers have begun offering ML functionality in some cloud-computing offerings that enable a user to configure training data, design an ML model, train the ML model using the training data, and host the trained ML model all at processing resources and storage locations in the service provider's cloud.

One popular task performed using ML is forecasting (e.g., prediction). To illustrate, an ML model may be trained to predict a particular state based on input data. For example, an ML model may be trained as a fraud detector to predict whether a financial transaction represented by input data is fraudulent (or not). Forecasting ML models are typically "data hungry" in that the ML models benefit from being trained using substantially large data sets. Such large data sets may not be available to smaller financial institutions, such as a local single-branch bank. Thus, a fraud detection ML model that is trained on data sets of multiple different financial institutions may have improved accuracy. Cloud service providers that offer ML functionality may be able to provide such an improved fraud detection model by collecting the data of multiple clients to use in training a global fraud detection model, if the clients are willing to share such data.

Although offloading the training and hosting of ML models from clients reduces the amount of computing resources required by the client to develop and use ML technology, such offloading sacrifices the privacy of the data used in the training process. In such cases, the entity that designs and creates an ML model (e.g., the cloud service provider) requires training data to train the ML model. If the training data is based on confidential or private information of the clients, the clients may not be willing to share such data with the entity, especially if there is a risk the data may be accessible to the other clients (e.g., potential competitors) or if there are laws or regulations related to data protection. To illustrate, the government and industry organizations have established a multitude of rules and regulations for financial institutions regarding privacy of clients' financial data. For at least these reasons, financial institutions may be unwilling or prohibited from sharing their clients financial data with cloud service providers to be used as training data for ML models. Although techniques for cooperative training of ML models are being explored, cloud service providers typically offer one-sided, non-cooperative ML training that fails to address these privacy concerns.

SUMMARY

Aspects of the present disclosure provide systems, methods, apparatus, and computer-readable storage media that support cooperative training of machine learning (ML) models that preserves privacy in untrusted environments using distributed executable file packages. To illustrate, executable file packages may be distributed to a server of a cloud services provider and to clients that agree to participate in cooperative training of an ML model. The executable file packages may include configuration files, ML libraries, pre-processing libraries, operating systems, scripts, other files, and the like that enable cooperative ML model training with multiple clients by a server that is otherwise configured for server-side (e.g., non-cooperative) ML model training. The cooperative ML model training may be used to train a fraud prediction model for financial transactions based on client-specific financial transaction data. Because financial transaction data may be private and confidential to the various clients (e.g., financial institutions), based on customer preferences, business or government regulations, or the like, financial institutions may not be willing to share client data for use in training a common fraud prediction model. However, a fraud prediction model that is trained based on training data from multiple clients may be more robust or accurate than individual fraud detection models trained by each client. In order to train a common fraud prediction model while maintaining data privacy, the executable file packages may cause the server and clients to perform cooperative learning, such as federated learning, split learning, or federated split learning, as non-limiting examples, that include each client training an individual partial or full ML model using their specific client data, and the server aggregating the multiple trained models to construct the fraud prediction model. Because trained ML model parameters are shared, instead of the client data, privacy of the client data is maintained. Additionally, because the cooperative training is initiated and controlled by the various executable file packages, client participation in the cooperative training may be mostly, or entirely, automated.

To illustrate, execution of an executable file package by a server may cause a server to generate an initial ML model parameter set and to provide the initial ML model parameter set, or one or more partial ML model parameter sets formed by splitting the initial ML model parameter set, to multiple client devices. The executable file package may include a configuration file, ML libraries, and the like to support cooperative training of ML models. In some implementations, the executable file package may include a Docker container. Each of the client devices may execute an executable file package to cause the client devices to implement and train a local ML model based on the received ML model parameter set. In some implementations, training the local ML models may include providing output data (e.g., smash data) to the server and receiving gradient data from the server, as further described herein. The client devices may provide trained ML model parameter sets to the server, and the server may aggregate the trained ML model parameter sets (after combining the trained ML model parameter sets with one or more server-side trained partial ML model parameter sets if the initial ML model parameter set is split) to generate an aggregated ML model parameter set. The aggregated ML model parameter set may represent a fraud prediction model that is trained based on multiple different clients' data. In some implementations, the aggregation may include weighting the various parameter sets based on factors related to the clients, as further described herein. The server may deploy the fraud prevention model, such as providing the fraud prevention model to the clients or implementing the fraud prevention model at an endpoint node for providing fraud prediction services.

In a particular aspect, a method for cooperative training, by a service provider, of machine learning models using distributed executable file packages includes executing, by one or more processors, an executable file package stored at a memory to generate and provide, to multiple client devices: a parameter set corresponding to an initial ML model, a parameter set corresponding to a partial ML model that is split from the initial ML model, or multiple parameter sets corresponding to multiple partial ML models that are split from the initial ML model. The executable file package includes one or more configuration files and one or more cooperative ML libraries. The method also includes receiving, by the one or more processors from the multiple client devices, respective output data or output parameter sets based on training of the initial ML model, the partial ML model, or the multiple partial ML models at the multiple client devices. Execution of the executable file package further causes aggregation of the output data or the output parameter sets to generate a ML model configured to generate a prediction based on input data. The method further includes initiating, by the one or more processors, deployment of the ML model to at least one of the multiple client devices, an endpoint node, or a combination thereof.

In another particular aspect, a system for cooperative training, by a service provider, of machine learning models using distributed executable file packages includes a memory and one or more processors communicatively coupled to the memory. The memory is configured to store an executable file package. The executable file package includes one or more configuration files and one or more cooperative ML libraries. The one or more processors are configured to execute the executable file package to cause the one or more processors to generate and provide, to multiple client devices: a parameter set corresponding to an initial ML model, a parameter set corresponding to a partial ML model that is split from the initial ML model, or multiple parameter sets corresponding to multiple partial ML models that are split from the initial ML model. The one or more processors are also configured to receive, from the multiple client devices, respective output data or output parameter sets based on training of the initial ML model, the partial ML model, or the multiple partial ML models at the multiple client devices. Execution of the executable file package further causes the one or more processors to aggregate the output data or the output parameter sets to generate an ML model configured to generate a prediction based on input data. The one or more processors are further configured to initiate deployment of the ML model to at least one of the multiple client devices, an endpoint node, or a combination thereof.

In another particular aspect, a non-transitory computer-readable storage medium stores instructions that, when executed by one or more processors, cause the one or more processors to perform operations for cooperative training, by a service provider, of machine learning models using distributed executable file packages. The operations include executing an executable file package stored at a memory to generate and provide, to multiple client devices: a parameter set corresponding to an initial ML model, a parameter set corresponding to a partial ML model that is split from the initial ML model, or multiple parameter sets corresponding to multiple partial ML models that are split from the initial ML model. The executable file package includes one or more configuration files and one or more cooperative ML libraries. The operations also include receiving, from the multiple client devices, respective output data or output parameter sets based on training of the initial ML model, the partial ML model, or the multiple partial ML models at the multiple client devices. Execution of the executable file package further causes aggregation of the output data or the output parameter sets to generate a ML model configured to generate a prediction based on input data. The operations further include initiating deployment of the ML model to at least one of the multiple client devices, an endpoint node, or a combination thereof.

In another particular aspect, a method for cooperative training, by a client, of machine learning models using distributed executable file packages includes obtaining, from a server, a parameter set corresponding to a ML model. The method also includes executing, by the one or more processors, an executable file package stored at a memory to cause the one or more processors to provide client data stored at the memory as training data to the ML model to train the ML model. The executable file package includes one or more configuration files and one or more cooperative ML libraries. Output data is generated during at least part of the training. The method further includes providing, by the one or more processors, the output data or an output parameter set corresponding to the trained ML model to the server for training of an aggregated ML model.

In another particular aspect, a device for cooperative training, by a client, of machine learning models using distributed executable file packages includes a memory and one or more processors communicatively coupled to the memory. The memory is configured to store client data and an executable file package. The executable file package includes one or more configuration files and one or more cooperative ML libraries. The one or more processors are configured to obtain, from a server, a parameter set corresponding to a ML model. The one or more processors are also configured to execute the executable file package to cause the one or more processors to provide the client data as training data to the ML model to train the ML model. Output data is generated during at least part of the training. The one or more processors are further configured to provide the output data or an output parameter set corresponding to the trained ML model to the server for training of an aggregated ML model.

In another particular aspect, a non-transitory computer-readable storage medium stores instructions that, when executed by one or more processors, cause the one or more processors to perform operations for cooperative training, by a client, of machine learning models using distributed executable file packages. The operations include obtaining, from a server, a parameter set corresponding to a ML model. The operations also include executing an executable file package stored at a memory to provide client data stored at the memory as training data to the ML model to train the ML model. The executable file package includes one or more configuration files and one or more cooperative ML libraries. Output data is generated during at least part of the training. The operations further include providing the output data or an output parameter set corresponding to the trained ML model to the server for training of an aggregated ML model.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support cooperative training of machine learning (ML) models that preserve privacy in untrusted environments using distributed executable file packages. To illustrate, executable file packages may be distributed to a server of a cloud services provider and to clients that agree to participate in cooperative training of an ML model. The executable file packages may include configuration files, ML libraries, pre-processing libraries, operating systems, scripts, other files, and the like that enable cooperative ML model training with multiple clients by a server that is otherwise configured for server-side (e.g., non-cooperative) ML model training. The cooperative ML model training may be used to train a fraud prediction model for financial transactions based on client-specific financial transaction data. Because financial transaction data may be private and confidential to the various clients (e.g., financial institutions), based on customer preferences, business or government regulations, or the like, financial institutions may not be willing to share client data for use in training a common fraud prediction model. However, a fraud prediction model that is trained based on training data from multiple clients may be more robust or accurate than individual fraud detection models trained by each client. In order to train a common fraud prediction model while maintaining data privacy, the executable file packages may cause the server and clients to perform cooperative learning, such as federated learning, split learning, or federated split learning, as non-limiting examples, that includes each client training an individual partial or full ML model using their specific client data, and the server aggregating the multiple trained models to construct the fraud prediction model. Because trained ML model parameters are shared, instead of the client data, privacy of the client data is maintained. Additionally, because the cooperative training is initiated and controlled by the various executable file packages, client participation in the cooperative training may be mostly, or entirely, automated.

Figure 1:
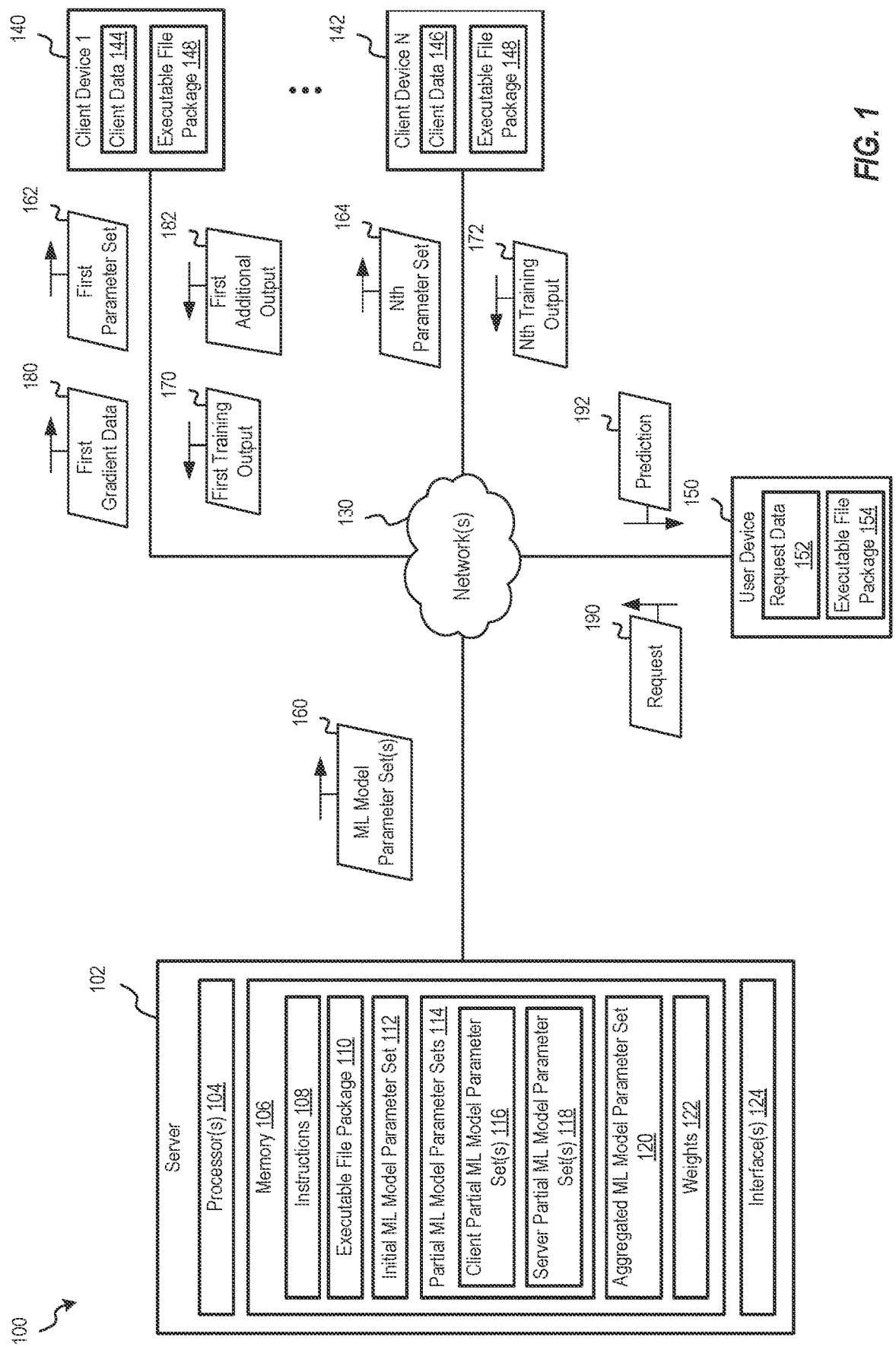
FIG. 1 is a block diagram of an example of a system that supports cooperative training of machine learning (ML) models using distributed executable file packages according to one or more aspects.

Referring to FIG. 1, an example of a system that supports cooperative training of ML models using distributed executable file packages according to one or more aspects is shown as a system 100. The system 100 may be configured to enable cooperative ML at least partially at a server and multiple clients in a manner that maintains data privacy for the clients. Because the server is configured for one-sided ML, the system 100 uses various executable file packages to support the cooperative ML in accordance with the configuration of the server. As shown in FIG. 1, the system 100 includes a server 102, a first client device 140, an Nth client device 142, a user device 150, and one or more networks 130. In some implementations, one or more of the first client device 140, the Nth client device 142, or the user device 150 may be optional, or the system 100 may include additional components, such as additional client devices or additional user devices, as a non-limiting example.

The server 102 is configured to train and deploy ML models in a distributed environment, such as a cloud-based system, as further described herein. In other implementations, the operations described with reference to the server 102 may be performed by a desktop computing device, a laptop computing device, a personal computing device, a tablet computing device, a mobile device (e.g., a smart phone, a tablet, a personal digital assistant (PDA), a wearable device, and the like), a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, and one or more communication interfaces 124. It is noted that functionalities described with reference to the server 102 are provided for purposes of illustration, rather than by way of limitation and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as the one of the one or more networks 130. To illustrate, one or more operations described herein with reference to the server 102 may be performed by one or more servers or a cloud-based system that communicates with one or more client or user devices, cloud-based systems of one or more clients or users, or a combination thereof. As a non-limiting example, the server 102 may be a server included in a cloud maintained by a cloud service provider, and one or more elements described herein as being stored at or retrieved from the server 102 may instead be stored at or retrieved from one or more other cloud storage locations maintained by the cloud service provider.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below. Additionally, the memory 106 may be configured to store data and information, such as an executable file package 110, an initial ML model parameter set 112, partial ML model parameter sets 114, an aggregated ML model parameter set 120, and weights 122. Illustrative aspects of the executable file package 110, the initial ML model parameter set 112, the partial ML model parameter sets 114, the aggregated ML model parameter set 120, and the weights 122 are described in more detail below.

The one or more communication interfaces 124 may be configured to communicatively couple the server 102 to the one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the server 102.

The first client device 140 and the Nth client device 142 are configured to communicate with the server 102 via the one or more networks 130 to cooperatively train one or more ML models. The client devices 140 and 142 may include computing devices, such as desktop computing devices, servers, laptop computing devices, personal computing devices, tablet computing devices, mobile devices (e.g., smart phones, tablets, PDAs, wearable devices, and the like), VR devices, AR devices, XR devices, vehicles (or component(s) thereof), entertainment systems, other computing devices, or a combination thereof, as non-limiting examples. Each of the client devices 140 and 142 may include a respective processor and a respective memory that stores instructions that, when executed by the processor, cause the processors to perform the operations described herein, similar to the server 102. The client devices 140 and 142 may also store client-specific data, which may be private or confidential to the respective client, and executable file packages received from the cloud service provider. To illustrate, the first client device 140 may store first client data 144 that is specific to a first client and an executable file package 148, and the Nth client device 142 may store Nth client data 146 that is specific to an Nth client and the executable file package 148. As further described herein, each client device may receive the same (or substantially similar) executable file package from the cloud service provider.

The client devices 140 and 142 may be owned, operated by, or otherwise associated with different clients of an entity associated with the server 102. For example, the server 102 may be included in a cloud or cloud-based system offered by a cloud service-provider and may provide ML and AI-based technology and products to various entities to perform certain tasks, the first client device 140 ("Client Device 1") may be associated with a first client (e.g., a first organization), and the Nth client device 142 ("Client Device N") may be associated with a second client (e.g., a second organization) that is different from the first client. Although two client devices 140 and 142 are depicted in FIG. 1, in other implementations, the system 100 may include more than two client devices that are associated with more than two distinct clients (e.g., there may be N client devices, and N may be any integer greater than or equal to two). The various clients may be in the same industry, or related industries. For example, the clients may include different financial institutions, such as banks, credit unions, credit card providers, investment agencies, loan companies, or the like.

The user device 150 is configured to communicate with the server 102 (or an endpoint node in the cloud that is managed by the server 102) via the one or more networks 130 to receive the service provided by the trained ML model(s). The user device 150 may include a computing device, such as a desktop computing device, a server, a laptop computing device, a personal computing device, a tablet computing device, a mobile devices (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. The user devices 150 may include a processor and a memory that stores instructions that, when executed by the processor, cause the processors to perform the operations described herein, similar to the server 102. The user device 150 may also store or have access to client-specific data, which may be private or confidential to the respective client, and an executable file package received from the cloud service provider. To illustrate, the user device 150 may store request data 152 that is based on client-specific data and an executable file package 154. As further described herein, each user device may receive the same (or substantially similar) executable file package from the cloud service provider. In some implementations, the user device 150 may be associated with one of the clients participating in the cooperative ML model training. For example, the user device 150 may include or correspond to the first client device 140 or the Nth client device 142. Alternatively, the user device 150 may be associated with a different client of the cloud service provider that subscribes to the ML and AI services provided by the cloud service provider but does not participate in the cooperative ML model training.

Because the various clients may be competitors, or potential competitors, each client may desire to keep some or all client-specific data private, and thus the system 100 may represent an untrusted environment. However, the client-specific data may be required to train a more robust ML model for use by the various clients. To preserve privacy, the present disclosure provides techniques for cooperative training and use of ML models by the server 102, the first client device 140, the Nth client device 142, and the user device 150 that do not require client-specific data, which may be needed as training data, to be shared between the devices. For example, cooperative training of ML models as described herein does not require the first client data 144 to be shared with the server 102 or the Nth client device 142, nor the Nth client data 146 to be shared with the server 102 or the first client device 140. As another example, use of the ML service supported by the trained ML models as described herein does not require the request data 152 to be shared with the first client device 140 or the Nth client device 142.

During operation of the system 100, the various clients may subscribe to services provided by the cloud service provider, such as computing, storage, and ML and AI services. The server 102 may be configured to offer one-sided, non-cooperative (e.g., service provider-side) ML design and training operations. In some implementations, the cloud service provider may provide a multitude of cloud-based services to a variety of clients, including configurable ML design and training services at the server 102. As a specific, non-limiting example, the cloud service provider may be Amazon, and the ML services may include Amazon SageMaker® (Amazon SageMaker is a registered trademark of Amazon Technologies, Inc. of Seattle, Washington). The cloud service provider, or a third party that provides cooperative ML training services using external cloud resources, may distribute executable file packages to the various entities to support cooperative ML training via the server 102. For example, the executable file package 110 may be distributed to the server 102, copies of the executable file package 148 may be distributed to the first client device 140 and the Nth client device 142, and the executable file package 154 may be distributed to the user device 150.

In some implementations, each type of entity may receive a different executable file package. For example, the executable file package 110 may be a service provider-side executable file package, the executable file package 148 may be a client-side executable file package, and the executable file package 154 may be a user-side executable file package. Although described as having different executable file packages for clients and users, in other implementations, there may be a single client-side executable file package for all clients and users. In some alternate implementations, there is one common executable file package that includes information for all devices, and different devices may perform different operations based on execution of the executable file package. For example, the executable file package 110, the executable file package 148, and the executable file package 154 may be the same executable file package, and execution of the respective executable file packages may cause the server 102, the client devices 140 and 142, and the user device 150 to perform at least some different operations.

The executable file packages 110, 148, and 154 may include various types of executable files, non-executable files, artifacts, scripts, libraries, and other data, and when installed on the respective devices, enable the devices to join and participate in a cooperative ML service without requiring that the devices support, or that the devices be operated by users with sufficient knowledge to perform, complex encryption algorithms, ML model aggregation, and communication functions such as model updates. To illustrate, the executable file packages 110, 148, and 154 may include operating systems (e.g., Linux-based or others), scripting libraries (e.g., Python or the like), ML libraries, configuration files, and executable files or applications for performing cooperative ML, data preprocessing, and communications between various clouds or devices. To further illustrate, the ML libraries, executable files, and applications may cause a device to train an ML model, or a partial ML model, to participate in training of a partial ML model with another device, to aggregate ML models, perform other ML-related operations, or a combination thereof. The configuration files may denote where particular data is to be stored, access privileges associated with storage locations, features to be included in training data, formatting, and the like. The preprocessing files and applications may cause a device to determine whether preprocessing on training or input data is to be performed and to perform the preprocessing if so determined. The communication files or applications may cause a device to communicate data to another device, such as in accordance with one or more formatting requirements, one or more application program interfaces (APIs), one or more cloud communication criteria, one or more command line interfaces (CLIs), or the like. In some implementations, the executable file packages 110, 148, and 154 may include or correspond to Docker containers. In other implementations, the executable file packages 110, 148, and 154 may include or correspond to other types of executable file packages.

After the executable file packages 110, 148, and 154 have been distributed to the server 102, the client devices 140 and 142, the user device 150, and the server 102 may initiate cooperative training of an ML model. In some implementations, the ML model may include or correspond to one or more neural networks (NNs), such as multi-layer perceptron (MLP) networks, convolutional neural networks (CNNs), recurrent neural networks (RNNs), deep neural networks (DNNs), long short-term memory (LSTM) NNs. In other implementations, the ML model may be implemented as one or more other types of ML models, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, or the like. The ML model may be cooperatively trained as a fraud predictor for financial transactions. To illustrate, the ML model may be trained to predict whether a financial transaction is fraudulent based on input financial data, and the clients may include or correspond to banks, credit unions, credit card providers, lenders, investment agencies, brokers, other financial institutions, or the like. In some implementations, the input financial data may indicate a transaction history, a billing address, an available credit line, a last transaction location, a transaction time, an amount of transactions during a threshold time period, or a combination thereof. For example, the ML model may be trained to predict that a financial transaction is fraudulent based on one or more underlying combinations of billing address, number of transactions during a threshold time period, and an amount of a transaction, as a non-limiting example. Although described herein in the context of fraud prediction for financial transactions, in other implementations, the ML model may be cooperatively trained to perform other types of predictions for other clients, such as in the health industry, network service providers, government agencies, or any other environment in which data privacy is important or required.

To initiate cooperative training of an ML model, the server 102 may execute the executable file package 110. Execution of the executable file package 110 may cause the server 102 to generate the initial ML model parameter set 112 that represents an initial ML model (e.g., an initial fraud prediction model). The server 102 may perform additional operations on the initial ML model parameter set 112 based on the type of machine learning configured by the executable file package 110. In some implementations, the executable file package 110 may cause the server 102 to perform a type of machine learning referred to as "federated learning." To perform federated learning, the server 102 copies the initial ML model parameter set 112 for each of the client devices and provides a copy to each client device for training at the respective client device.

Alternatively, the executable file package 110 may cause the server 102 to "split" the initial ML model parameter set 112 into the partial ML model parameter sets 114 that represent partial ML models split from the initial ML model. As used herein, "splitting" an ML model may refer to generating multiple parameter sets representing partial ML models based on a parameter set that represents a "complete" ML model (e.g., the initial ML model parameter set 112). The various parameter sets include values of one or more structural parameters that represent configurations of respective ML models. For example, if the initial ML model is a NN, the structural parameters may include a number of layers, a number of hidden layers, a number of nodes per layer or per type of layer, a number of input nodes, a number of output nodes, a number of hidden nodes, a number of connections per node, weights of connections, activation functions associated with nodes, or the like. The structural parameters may include one or more of what may be referred to in some ML literature as model parameters and/or hyper-parameters. If the ML is an SVM, a decision tree, a random forest, a regression model, a BN, a DBN, a NB model, a Gaussian process, a HMM, a regression model, or the like, the corresponding structural parameters are specific to the type of ML model.

To illustrate splitting of an ML model in implementations in which the ML model is an NN, the initial ML model parameter set 112 may include values of structural parameters such as an architecture type (e.g., MLP network, CNN, RNN, DNN, or the like), a number of layers, a number of hidden layers, a number of input nodes, a number of output nodes, a number of hidden nodes, a number of nodes per layer or per type of layer, a number of connections per node, or the like, and optionally other initial parameter values such as initial weights assigned to the various connections, activation functions, or the like. Although described in the context of NNs, in other implementations, the ML models may be other types of ML models, and the parameters may include parameters associated with the other types of ML models. To split the initial ML model, the server 102 may generate two (or more) parameter sets that each represent a respective partial ML model that is part of the initial ML model. For example, if the initial ML model parameter set 112 indicates an input layer, eight hidden layers, and an output layer, the server 102 may generate a first parameter set that represents a first partial ML model having three layers (the input layer and the first two hidden layers), and a second parameter set that represents a second partial ML model having seven layers (the remaining six hidden layers and the output layer). In such an example, the first parameter set and the second parameter set may be combined to construct the initial ML model parameter set 112, such that the first partial ML model having three layers and the second partial ML model having seven layers may be combined to reconstruct the initial ML model having ten total layers (e.g., the input layer, the eight hidden layers, and the output layer). The server 102 may split the initial ML model the same way for each client or may perform different splits for at least some different clients, depending on the type of machine learning to be performed. Examples of splitting an ML model are further described herein with reference to FIG. 2.

In some implementations, the executable file package 110 may cause the server 102 to perform a type of machine learning referred to as "split learning." To perform split learning, the server 102 performs the same split for each client. To illustrate, the server 102 may generate multiple copies of a client partial ML model parameter set 116 and a server partial ML model parameter set 118. The client partial ML model parameter set 116 represents the same client-side partial ML model that is to be trained by each client, and the server partial ML model parameter set 118 represents a server-side partial ML model that is to be trained by the server 102. As a non-limiting example, if an initial ML model has ten layers, each copy of the client partial ML model parameter set 116 may represent three layers and each copy of the server partial ML model parameter set 118 may represent seven layers. In some other implementations, the executable file package 110 may cause the server 102 to perform client-specific splitting of the initial ML model, which may be referred to as "federated split learning." To perform this type of machine learning, the server 102 may perform multiple splits on multiple copies of a common initial ML model parameter set to generate different parameter sets for each, or at least some, clients, or the server 102 may split each of multiple individual initial ML model parameter sets, which may be different for at least some clients. To illustrate, the server 102 may generate multiple copies of the initial ML model parameter set 112 (e.g., one for each client) and may split each of the multiple copies to generate the partial ML model parameter sets 114 that include multiple client partial ML model parameter sets 116 and multiple server partial ML model parameter sets 118, at least some of which are different from others associated with other clients. For example, if the initial ML model includes ten total layers, a first copy of the initial ML model parameter set 112 may be split into a first parameter set of the client partial ML model parameter sets 116 that configures a first partial ML model having four total layers and a first parameter set of the server partial ML model parameter sets 118 that configures a second partial ML model having six total layers. Additionally, a second copy of the initial ML model parameter set 112 may be split into a second parameter set of the client partial ML model parameter sets 116 that configures a third partial ML model having five total layers and a second parameter set of the server partial ML model parameter sets 118 that configures a fourth partial ML model having five total layers. In some other implementations, the server 102 may generate different initial ML models that are split for the different clients, and the splitting may be the same or different for the various clients. As a non-limiting example, a first initial ML model having ten total layers may be split into a first parameter set of the client partial ML model parameter sets 116 that configures a first partial ML model having three total layers and a first parameter set of the server partial ML model parameter sets 118 that configures a second partial ML model having seven total layers, and a second initial ML model having twelve total layers may be split into a second parameter set of the client partial ML model parameter sets 116 that configures a third partial ML model having four total layers and a second parameter set of the server partial ML model parameter sets 118 that configures a fourth partial ML model having eight total layers. The client partial ML model parameter sets 116 may be designated for training by the client devices 140 and 142.

The executable file package 110 may cause the server 102 to how to split the initial ML model parameter set 112 (e.g., the sizes of the parameter sets for the client devices and the server 102) based on factors associated with the various clients. To illustrate, relevant characteristics of the clients or the client devices 140 and 142, such as computing resources available at the client devices 140 and 142, relative sizes of the client-specific data (e.g., the first client data 144 and the Nth client data 146) accessible to the client devices 140 and 142, priorities associated with the clients, other client or client device characteristics, or a combination thereof, and the server 102 may determine the splitting based on the characteristics in order improve or optimize the robustness of resultant aggregate ML model(s) and the use of available computing resources at the server 102 and the client devices 140 and 142. For example, the server 102 may split the initial ML model such that the server partial ML model parameter sets 118 have a relatively large number of parameters based on client-side computing resources failing to satisfy a first threshold, as compared to causing the server partial ML model parameter sets 118 to have fewer parameters based on the client-side computing resources satisfying the first threshold. As another example, the server 102 may split the initial ML model such that the server partial ML model parameter sets 118 have a relatively large number of parameters based on the relative size of the client-specific data failing to satisfy a second threshold, as compared to causing the server partial ML model parameter sets 118 to have fewer parameters based on the relative size satisfying the second threshold. It will be appreciated that the split between client-side partial ML models and server-side partial ML models may be similarly based on any desired characteristic or information associated with the clients. Additionally or alternatively, the server 102 may split the initial ML model such that a first parameter set of the client partial ML model parameter sets 116 has a relatively larger number of parameters than a second parameter set of the client partial ML model parameter sets 116 based on a first client having a relatively greater quantity of client data to be used for training than a second client. It will be appreciated that the differences between client-side partial ML models of different clients may be similarly based on any desired characteristic or information associated with the clients. Performing individual splits on a client-by-client basis is more flexible and may improve the robustness of a resulting trained ML model as well as improve computing resource utilization across the server 102, the first client device 140, and the Nth client device 142 as compared to performing the same split for all clients, or not splitting the initial ML model. Specific examples of splitting ML models into different partial ML models for different clients are described herein with reference to FIG. 2.

After generating the initial ML model parameter set 112 (and optionally splitting the initial ML model parameter set 112 into the partial ML model parameter sets 114, the server 102 may provide ML model parameter sets 160 to the client devices. For federated learning implementations, the ML model parameter sets 160 may include copies of the initial ML model parameter set 112 for each of the client devices. For split learning implementations, the ML model parameter sets 160 may include copies of the client partial ML model parameter set 116 for each of the client devices. For federated split learning implementations, the ML model parameter sets 160 may include individual parameter sets of the client partial ML model parameter sets 116 for each of the client devices. Providing the ML model parameter sets 160 may include transmitting the ML model parameter sets 160 to the client devices 140 and 142 or transferring the ML model parameter sets 160 to storage locations associated with the client devices 140 and 142, such as cloud storage locations, as further described herein with reference to FIGS. 3-5.

The client devices 140 and 142 may execute respective copies of the executable file package 148 to cause the client devices 140 and 142 to implement ML models based on the ML model parameter sets 160 and to train the respective ML models based on client-specific data. For example, the first client device 140 may implement a first ML model (e.g., the initial ML model, a common partial ML model, or a client-specific ML model) based on a first parameter set 162 of the ML model parameter sets 160, and the first client device 140 may train the first ML model by providing the first client data 144 as training data to the first ML model. Training of the first ML model may cause generation, by the first client device 140, of a first training output 170. The first training output 170 may include a trained ML model parameter set (e.g., for federated learning implementations) or output data (e.g., for split learning or federated split learning implementations) that is output during training of the first ML model at the first client device 140, such as gradient output during back-propagation of the first ML model using outputs of the last layer of the corresponding server-side ML model, weights of connections between nodes of the first ML model, modifications to the first parameter set 162, or any other data generated during or resulting from training of the first ML model. Output data from training ML models may also be referred to as "smash" data. The first client device 140 may transmit the first training output 170 to the server 102 for use in aggregating a trained ML model, which may include training the corresponding server-side partial ML model in split learning and federated split learning implementations.

To illustrate split learning or federated split learning implementations, the server 102 may implement a first server ML model (e.g., a third ML model) based on the server partial ML model parameter set 118 (or a first parameter set of the server partial ML model parameter set 118), and the server 102 may provide the first training output 170 (e.g., output data or smash data) as training data to the first server ML model. In some implementations, the training of the first server ML model includes back propagation using gradient data. For example, first gradient data 180 may be generated during or resulting from a forward-portion of training, and the first gradient data 180 may be back-propagated through the first server ML model as part of the training. Additionally, after backpropagation through the first server ML model (and any updates to the first gradient data 180 therefrom), the server 102 may transmit the first gradient data 180 to the first client device 140. The first client device 140 may use the first gradient data 180 for backpropagation through the first ML model to further train (or complete training or part of the training of) the first ML model. Any additional output data generated during this training may be provided to the server 102 as first additional output 182 for use in further training the first server ML model. In some implementations, any output data and gradient data shared between the server and the first client device 140 may be encrypted. This process of sharing output data and gradient data between the server 102 and the first client device 140 may continue until the first ML model and the first server ML model are trained (e.g., to a particular accuracy score, for a particular amount of time, or the like). Completion of the training of the first ML model and the first server ML model results in modification of the client partial ML model parameter set 116 (or a first parameter set of the client partial ML model parameter set 116), the server partial ML model parameter set 118 (or a first parameter set of the server partial ML model parameter set 118), or both, at the server 102, to account for changes to the partial ML models due to the training.

Similar operations may be performed at the Nth client device 142. For example, the Nth client device 142 may implement a second ML model based on a second parameter set 164 of the ML model parameter sets 160, and the Nth client device 142 may train the second ML model by providing the Nth client data 146 as training data to the second ML model. Training of the second ML model may cause generation, by the Nth client device 142, of Nth training output 172. The Nth training output 172 may include a second set of trained ML model parameters or second output data (e.g., second smash data) that includes gradient output during back propagation of the second ML model using outputs of the last layer of a corresponding server-side ML model, weights of connections between nodes of the second ML model, modifications to the second parameter set 164, or any other data generated during or resulting from training of the second ML model. The Nth client device 142 may transmit the Nth training output 172 to the server 102 for use in aggregating an ML model or training the corresponding server-side partial ML model. As example of split learning or federated learning, the server 102 may implement a second server ML model (e.g., a fourth ML model) based on the server partial ML model parameter set 118 (or a second parameter set of the server partial ML model parameter sets 118), and the server 102 may provide the Nth training output 172 (e.g., second output data) as training data to the second server ML model. In some implementations, the training of the second server ML model includes back propagation using gradient data and training based on additional output data, as described with reference to the first gradient data 180 and the first additional output 182 for the first client device 140. This process of sharing output data and gradient data between the server 102 and the Nth client device 142 may continue until the second ML model and the second server ML model are trained (e.g., to a particular accuracy score, for a particular amount of time, or the like). Completion of the training of the second ML model and the second server ML model results in modification of the client partial ML model parameter set 116 (or a second parameter set of the client partial ML model parameter set 116), the server partial ML model parameter set 118 (or a second parameter set of the server partial ML model parameter set 118), or both, at the server 102, to account for changes to the partial ML models due to the training.

In some implementations, the executable file package 148 may include one or more pre-processing libraries and any other files or information to enable the client devices 140 and 142 to selectively perform pre-processing on the respective client data prior to using the client data as training data. For example, the first client device 140 may selectively perform one or more pre-processing operations on the first client data 144 prior to using the first client data 144 as training data, and the Nth client device 142 may selectively perform one or more pre-processing operations on the Nth client data 146 prior to using the Nth client data 146 as training data. The pre-processing operations may include extracting a particular set of feature values from the respective client data, removing or discarding features having duplicate or null values, extrapolating one or more missing feature values, formatting feature values, discarding one or more particular features, compressing or encoding one or more feature values, other pre-processing operations, or a combination thereof. Additionally or alternatively, the pre-processing operations may include removing one or more features that are not included in a common training data format, estimating values for one or more features of the common training data format that are not included in the respective client data, or a combination thereof. Although the client data is described as being stored at the respective client device, the client data may also include other data accessible to the client device, such as data from a website maintained by or accessible to the client device, mobile data generated by or received by the client device, data stored in a data center accessible to the client device, or the like. The pre-processing may be performed automatically, based on a comparison of the respective client data to a common training data format, based on a statistical analysis of the respective client data, or the like. Additional details of pre-processing are described further herein with reference to FIG. 3.

After training of the ML models (e.g., the full or partial ML models) is complete, the executable file package 110 may cause the server 102 to aggregate related ML models (e.g., full or partial ML models) to construct an aggregated ML model parameter set 120 that indicates an aggregated ML model. If the executable file package 110 is configured for federated learning, the server 102 may aggregate the received trained ML parameter sets from the client devices to construct the aggregated ML model parameter set 120. If the executable file package 110 is configured for split learning or federated split learning, the server 102 may separately aggregate the client-side partial ML models (and the server-side partial ML models for federated split learning) prior to combining the aggregated client-side partial ML model and the server-side partial ML model (or aggregated server-side partial ML model) to construct the aggregated ML model parameter set 120. Alternatively, for some federated split learning implementations, the server 102 may combine each client-side partial ML model with the corresponding server-side partial ML model prior to aggregating the resulting ML models to construct the aggregated ML model parameter set 120. In some implementations, to reduce the processing burden on the server 102, if the number of clients participating in the cooperative learning is larger than a threshold, a subset of the trained ML models may be selected for use in constructing the aggregated ML model parameter set 120. The subset of trained ML models may be selected randomly, based on priorities of the clients, based on amounts of client data available to the clients, based on reception times, or other parameters.

In some implementations, aggregating may include averaging corresponding structural parameter values from different parameter sets (corresponding to different ML models). For example, the server 102 may aggregate two parameter sets by determining an average value of various structural parameters between the two parameter sets, such as an average number of hidden layers, an average number of output nodes, an average weight for one or more connections between nodes, or the like. As an illustrative example, if a first partial ML model has four nodes per hidden layer and a second partial ML model has six nodes per hidden layer, the server 102 may average the number of hidden nodes per layer of the two partial ML models, resulting in an aggregate ML model having five nodes per hidden layer (i.e., (4+6)/2=5). The server 102 may aggregate the various parameter sets (corresponding to the various ML models) serially or in parallel (e.g., concurrently). Additionally or alternatively, the server 102 may initiate aggregation responsive to receiving the entirety of output data from the first client device 140 and the Nth client device 142 and completing training of the partial ML models, responsive to completing training of a threshold number of partial ML models, responsive to a threshold amount of time elapsing, or responsive to other situations.

In some other implementations, aggregating may include performing a weighted average of the structural parameter values. To illustrate, the server 102 may assign weights 122 to the various parameter sets (corresponding to the various partial ML models) prior to averaging the weighted structural parameter values. The server 102 may assign the weights 122 based on the client-related factors, similar to determining how to split the initial ML model parameter set 112 based on client-related factors. As an example, if the first client device 140 has significantly fewer available computer resources than the Nth client device 142, the server 102 may assign a relatively low weight to the first training output 170 and a relatively high weight to the Nth training output 172, such as a first weight of 0.3 and a second weight of 0.7, respectively. As another example, if the first client data 144 has significantly larger relative size than the Nth client data 146, the server 102 may assign a relatively high weight to the first training output 170 and a relatively low weight to the Nth training output 172, such as a first weight of 0.8 and a second weight of 0.2, respectively. As yet another example, if the first client has lower priority than the second client, the server 102 may assign a relatively low weight to first training output 170 and a relatively high weight to the Nth training output 172, such as a first weight of 0.5 and a second weight of 0.6, respectively. It will be appreciated that the weights assigned to the various training outputs (e.g., the various ML models) may be similarly based on any desired characteristic or information related to the clients. After assigning the weights 122, the server 102 may perform a weighted average of the structural parameter values to construct the aggregated ML model parameter set 120.

In some implementations, the ML models to be aggregated have same structure, such as the corresponding parameter sets having the same number and order of parameters, and the server 102 may aggregate (e.g., average, weighted average, or another aggregation/combination operation) on a parameter-by-parameter basis for an entirety, or a selected subset, of the parameter sets being aggregated. In some other implementations, the ML models to be aggregated have different structures, such as the corresponding parameter sets having different amounts of parameters, and the server 102 may convert the ML models to a common format prior to performing the aggregation. In some implementations, the server 102 may convert ML models to a common format by compressing ML models having a larger size or more detailed structure (e.g., parameter sets including more parameters) to the same size or structure (e.g., the same number of parameters) as an ML model with the smallest size or least-detailed structure (e.g., the fewest parameters) or some predefined format. For example, if one ML model has six hidden layers and another ML model has five hidden layers, one hidden layer may be pruned (or two hidden layers may be merged) such that both ML models have five hidden layers. As another example, if one ML model has a layer with four nodes and another ML model has a layer with three nodes, one node may be pruned (or two nodes may be merged) such that both ML models have layers with three nodes. In some other implementations, the server 102 may extrapolate to expand ML models with smaller sizes or less detailed structures to convert the ML models to a larger size or more detailed common format. After converting the various ML models to the common format, the server 102 may aggregate the ML models as described above.

In some implementations, the splitting, training, and aggregating are repeated for multiple iterations or epochs. To illustrate, after the server 102 constructs the aggregated ML model parameter set 120, the server 102 may split the aggregated ML model parameter set 120 into client-side and server-side parameter sets. The server 102 may provide the parameter sets that represent client-side partial ML models to the client devices 140 and 142 while retaining the parameter sets that represent the server-side partial ML models at the server 102, and the training and aggregation process may be repeated. In some implementations, the server 102 may perform the same splitting on the aggregated ML model parameter set 120 as performed on the initial ML model parameter set 112, such that the size and structure of the partial ML models created from splitting the aggregated ML model parameter set 120 are the same as the size and structure of the partial ML models created from splitting the initial ML model parameter set 112. In some other implementations, the server 102 may perform different splits during different iterations or epochs. For example, the size and structure of the partial ML models created from splitting the aggregated ML model parameter set 120 may be different than the size and structure of the partial ML models created from splitting the initial ML model parameter set 112. The splitting, training, and aggregating process may continue until the resulting aggregate ML model satisfies an accuracy threshold, until a threshold time period has lapsed, or based on some other constraint.

After the training process is complete and the aggregated ML model parameter set 120 is finalized, the executable file package 110 may cause the server 102 to deploy the aggregate ML model. For example, the server 102 may transmit the aggregated ML model parameter set 120 to the first client device 140, the Nth client device 142, and/or any other client device for implementing a robust ML model for use in performing one or more actions. For example, the aggregate ML model implemented based on the aggregated ML model parameter set 120 may be configured to predict if a financial transaction represented by input financial data is fraudulent. Additionally or alternatively, the server 102 may deploy the aggregated ML model parameter set 120 to an endpoint node that implements an ML model to provide similar fraud predictions at the endpoint node.

If the aggregated ML model parameter set 120 is deployed to the endpoint node or otherwise hosted by the server 102, the server 102 (or the endpoint node) may be configured to provide ML services to the client devices, user devices that subscribe to the ML services, other devices, or a combination thereof. The ML services may include receiving requests that indicate financial transactions and providing predictions of whether the financial transactions are fraudulent (or legitimate). To illustrate, the user device 150 may execute the executable file package 154 to participate in the ML services. In some implementations, the executable file package 154 (e.g., a user-side executable file package) may include a subset of the executable file package 148, such as a configuration file, an operating system, scripts, preprocessing libraries, and the like, without including the ML libraries and files. Execution of the executable file package 154 may cause the user device to generate a request 190 based on the request data 152 stored at (or accessible to) the user device 150. The request data 152 may include financial data that indicates a particular financial transaction, and the request 190 may include feature data extracted from the request data 152 for use in predicting whether the particular financial transaction is fraudulent. In some implementations, the user device 150 may perform one or more pre-processing operations on the request data 152 prior to generating the request 190, similar to the pre-processing operations performed by the client devices 140 and 142. Additionally or alternatively, the request 190 may be encrypted to preserve privacy of the request data 152.

The user device 150 may transmit the request 190 to the endpoint node, or to the server 102 if the server 102 facilities communication with the endpoint node or supports the fraud prediction model (e.g., the aggregated ML model parameter set 120). The request 190 may be provided as input data to the fraud prediction model, and the fraud prediction model may output a prediction 192 that indicates whether the particular financial transaction indicated by the request 190 is fraudulent (or legitimate). The endpoint node, or the server 102, may transmit the prediction 192 to the user device 150. The user device 150 may validate the particular financial transaction based on the prediction 192. For example, if the prediction 192 indicates a legitimate transaction, the user device 150 may initiate one or more operations to confirm or perform the particular financial transaction. Alternatively, if the prediction 192 indicates a fraudulent transaction, the user device 150 may initiate one or more fraud prevention operations or deny the particular financial transaction.

As described above, the system 100 supports cooperative training of ML models that efficiently uses available computing resources at the server 102, the first client device 140, and the Nth client device 142 while preserving privacy of client data used to train the ML models. Privacy is preserved because client-specific data (e.g., the first client data 144 and the Nth client data 146) is not shared between the server 102, the first client device 140, and the Nth client device 142. Although trained ML model parameters (and in some implementations output data and gradient data) may be shared between the server 102 and the respective client device, such data is not shared with other client devices nor is such data able to be processed to construct the client-specific data by another entity. Thus, privacy of sensitive client data is preserved while enabling computing resource-intensive training to be offloaded to the server 102 (or one or more cloud-based processing systems) that may have significantly more computing resources than the client devices 140 and 142, as compared to each client training an individual fraud prediction model. Additionally, the system 100 train more robust fraud prediction models by using multiple different client data sets than individual fraud prediction models trained by clients. By using the distributed executable file packages, this cooperative training of fraud prediction models may be performed by a server of a cloud services provider that otherwise is configured for non-cooperative, server-side ML model training. Additionally, because the participation of the clients is initiated and controlled by execution of the respective executable file packages, a client does not need to employ a computer programmer or data scientist to oversee and control the client-side ML model training and pre-processing operations.

Figure 2:
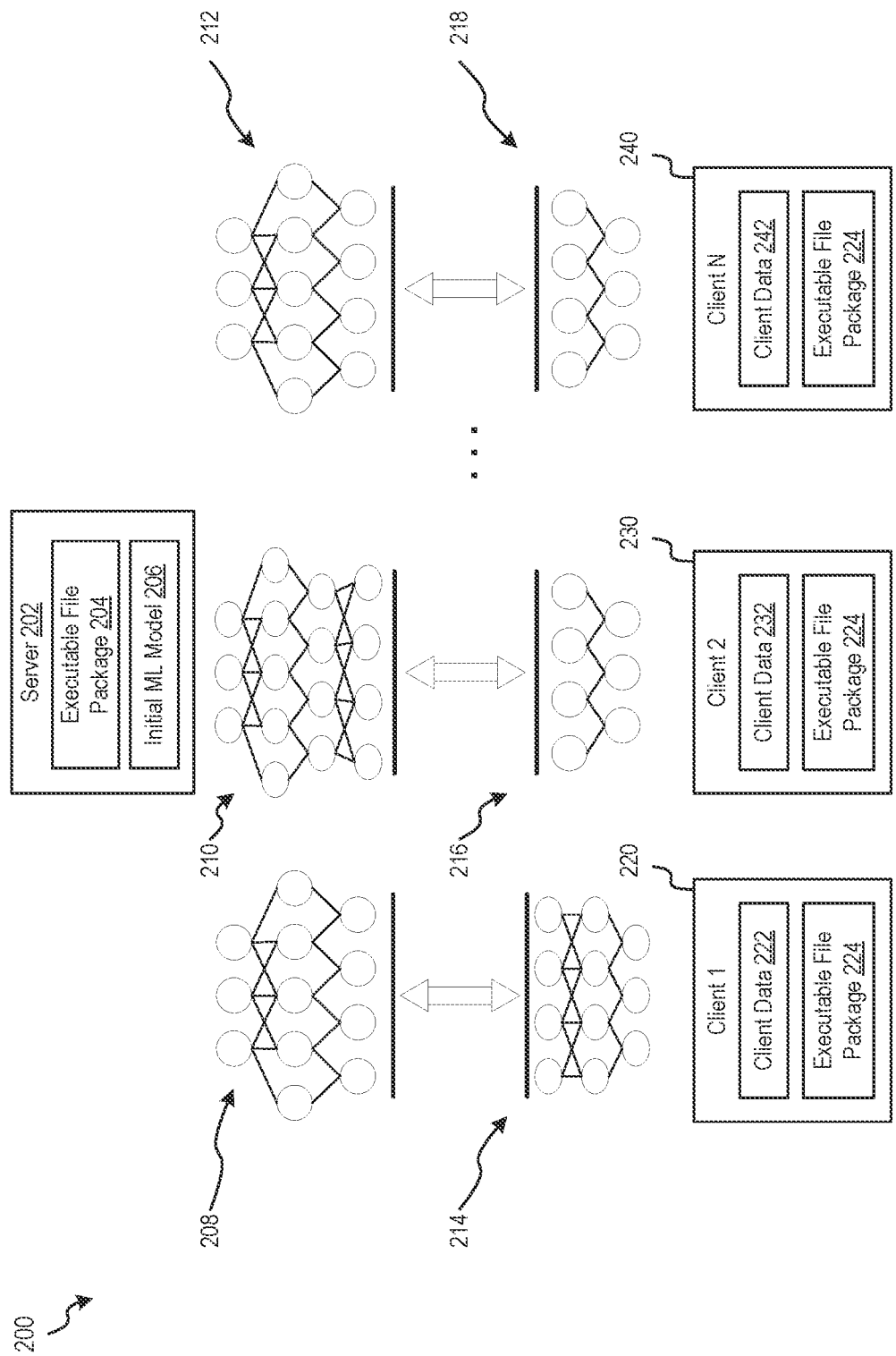
FIG. 2 is a block diagram of an example of cooperative training of ML models according to one or more aspects.

Referring to FIG. 2, an example of a system that supports cooperative training of ML models is shown as a system 200. In some implementations, the system 200 of FIG. 2 may include or correspond to the system 100 of FIG. 1 (or components thereof). As shown in FIG. 2, the system 200 includes a server 202, multiple partial ML models 208, 210, 212, 214, 216, and 218, a first client device 220, a second client device 230, and an Nth client device 240. Although three client devices and corresponding pairs of partial ML models are shown in FIG. 2, in other implementations the system 200 may include fewer than three or more than three client devices and corresponding pairs of partial ML models.

The server 202 includes an executable file package 204 (e.g., a server-side executable file package) and an initial ML model 206. The server 202 may be configured to execute the executable file package 204, and execution of the executable file package 204 may cause the server 202 to "split" one or more ML models into multiple partial ML models. For example, the server 202 may split the initial ML model 206 into partial ML model 208 and partial ML model 214 (e.g., a first pair of partial ML models that correspond to the first client device 220). As another example, the server 202 may split the initial ML model 206 into partial ML model 210 and partial ML model 216 (e.g., a second pair of partial ML models that correspond to the second client device 230). As yet another example, the server 202 may split the initial ML model 206 into partial ML model 212 and partial ML model 218 (e.g., an Nth pair of partial ML models that correspond to the Nth client device 240). Although FIG. 2 shows splitting the initial ML model 206 into pairs of partial ML models, in other implementations, the server 202 may split the initial ML model 206 into more than two partial ML models during each split. The partial ML models 214, 216, and 218 may be referred to as client-side partial ML models, and each of the partial ML models 214, 216, and 218 may be configured to be trained at the client devices 220, 230, and 240, respectively. The partial ML models 208, 210, and 212 may be referred to as server-side partial ML models, and each of the partial ML models 208, 210, and 212 may be configured to be trained at the server 202.

Each of the partial ML models 208-218 may be represented by a corresponding parameter set that indicates values of one or more structural parameters of the respective partial ML model. The structural parameters may include a number of layers, a number of hidden layers, a number of nodes per layer or per type of layer, a number of input nodes, a number of output nodes, a number of hidden nodes, a number of connections per node, weights of connections, activation functions associated with nodes, or the like. Splitting an ML model may result in two parameter sets corresponding to two partial ML models that, when combined, can reconstruct a parameter set corresponding to the original ML model.

As shown in FIG. 2, a client-side partial ML model and a server-side partial model split from the same initial model may have different sizes and/or structures. As an example, although partial ML model 214 and partial ML model 208 each include three layers (e.g., each have relatively the same size), the structure of partial ML model 214 is different than the structure of partial ML model 208, such as each layer of partial ML model 214 having a different number of nodes than the corresponding layer of partial ML model 208 (e.g., the first layers include three and four nodes, respectively, the second layers include four and five nodes, respectively, and the third layers include four and three nodes, respectively). The split of the first ML model that results in partial ML models 214 and 208 may be based on client information, as described above with reference to FIG. 1, such as computing resources available at the first client device 220, a relative size of client data accessible to the first client device 220, or the like.

In some implementations, the server 202 may split the initial ML model 206 in the same manner for each client, such that each client-side partial ML model has the same size and structure as partial ML model 214, and each server-side partial ML model has the same size and structure as partial ML model 208. Alternatively, the server 202 may split the initial ML model 206 differently for one or more clients than for one or more other clients. In the example of FIG. 2, the server 202 splits the initial ML model 206 differently for the first client and the second client. In this manner, client-side partial ML models may have different sizes or structures for different clients. For example, partial ML model 214 includes three layers and partial ML model 216 includes two layers. Additionally, server-side partial ML models may have different sizes or structures for two different clients. For example, partial ML model 208 includes three layers and partial ML model 210 includes four layers. Additionally or alternatively, the server 202 may prune one or more nodes or layers or otherwise modify the structure of the initial ML model 206 during splitting, such that a combination of the partial ML models associated with one client may have a different size or structure than a combination of partial ML models associated a different client. For example, partial ML model 218 may have the same number of layers and structure of nodes as partial ML model 216, but partial ML model 212 may not have the same number of layers or structure of nodes as partial ML model 210. Additionally, partial ML model 212 may have the same number of layers and structure of nodes as partial ML model 208, but partial ML model 218 may not have the same number of layers or structure of nodes as partial ML model 214. It should be appreciated that the partial ML models shown in FIG. 2 are illustrative examples, and in other implementations, the various ML models may have different numbers of layers, numbers of nodes, structures, and the like. One of skill in the art will understand that many arrangements are possible with varying parameters being both the same or different between multiple client-side partial ML models, between multiple server-side partial ML models, and between client-side partial ML models and server-side partial ML models.

After the server 202 splits the initial ML model 206 into the partial ML models 208-218, the server 202 may provide the client-side partial ML models to the respective client devices 220, 230, and 240 for training. Each of the client devices 220, 230, and 240 may execute an executable file package 224 (e.g., a client-side executable file package) that causes the respective client device to train a partial ML model based on individual client data (e.g., private client-specific data) to perform fraud prediction. For example, the first client device 220 may train the partial ML model 214 based on client data 222, which may be financial transaction data that is private, confidential, or the like with respect to the first client. Similarly, the second client device 230 may train the partial ML model 216 based on client data 232, and the Nth client device 240 may train the partial ML model 218 based on client data 242. During training at the client devices 220, 230, and 240, output data that is generated may be shared with the server 202 for use in training the server-side partial ML models. For example, the server 202 may train the partial ML models 208, 210, and 212 based on output data received from the client devices 220, 230, and 240, respectively. For example, the server 202 may train the partial ML model 208 based on output data received from the first client device 220 during training of the partial ML model 214. Similarly, the server 202 may train the partial ML model 210 based on output data received from the second client device 230 during training of the partial ML model 216, and the server 202 may train the partial ML model 212 based on output data received from the Nth client device 240 during training of the partial ML model 218. In some implementation, the training may include backpropagation and sharing of gradient data from the server 202 to the client devices 220, 230, and 240, as described above with reference to FIG. 1.

After partial ML models 208-218 are trained, execution of the executable file package 204 may cause the server 202 to aggregate multiple partial ML models to construct an aggregated ML model. For example, the server 202 may aggregate partial ML models 208-212 to construct an aggregated server-side partial ML model, the server 202 may aggregate the partial ML model 214-218 to construct an aggregated client-side partial ML model, and the aggregated server-side partial ML model may be combined with the aggregated client-side partial ML model to construct an aggregated ML model. Alternatively, each pair of client-side and server-side partial ML models may be combined, and the server 202 may aggregate the combined ML models to construct the aggregated ML model. Aggregating may include averaging, weighted averaging, or other forms of combining structural parameter values from multiple ML models (or partial ML models), as described above with reference to FIG. 1. In some implementations, prior to aggregation, multiple ML models (or partial ML models) may be converted to a common format, such as a common number of layers, number of nodes per layer, etc., as described above with reference to FIG. 1. Thus, the system 200 enables cooperative training of ML models (e.g., an aggregated ML model) by the server 202 and the client devices 220, 230, and 240 that offloads computer-resource intensive training operations from the client devices 220, 230, and 240 to the server 202 and that preserves privacy (e.g., client data 222, 232, and 242 is not shared with other entities) in an untrusted environment. Additionally, the cooperative training is performed by execution of executable file packages at the respective devices, which leverages machine learning operations configured at the server 202 to provide cooperative training without requiring a data technician to oversee and control the cooperative training.

Figure 3:
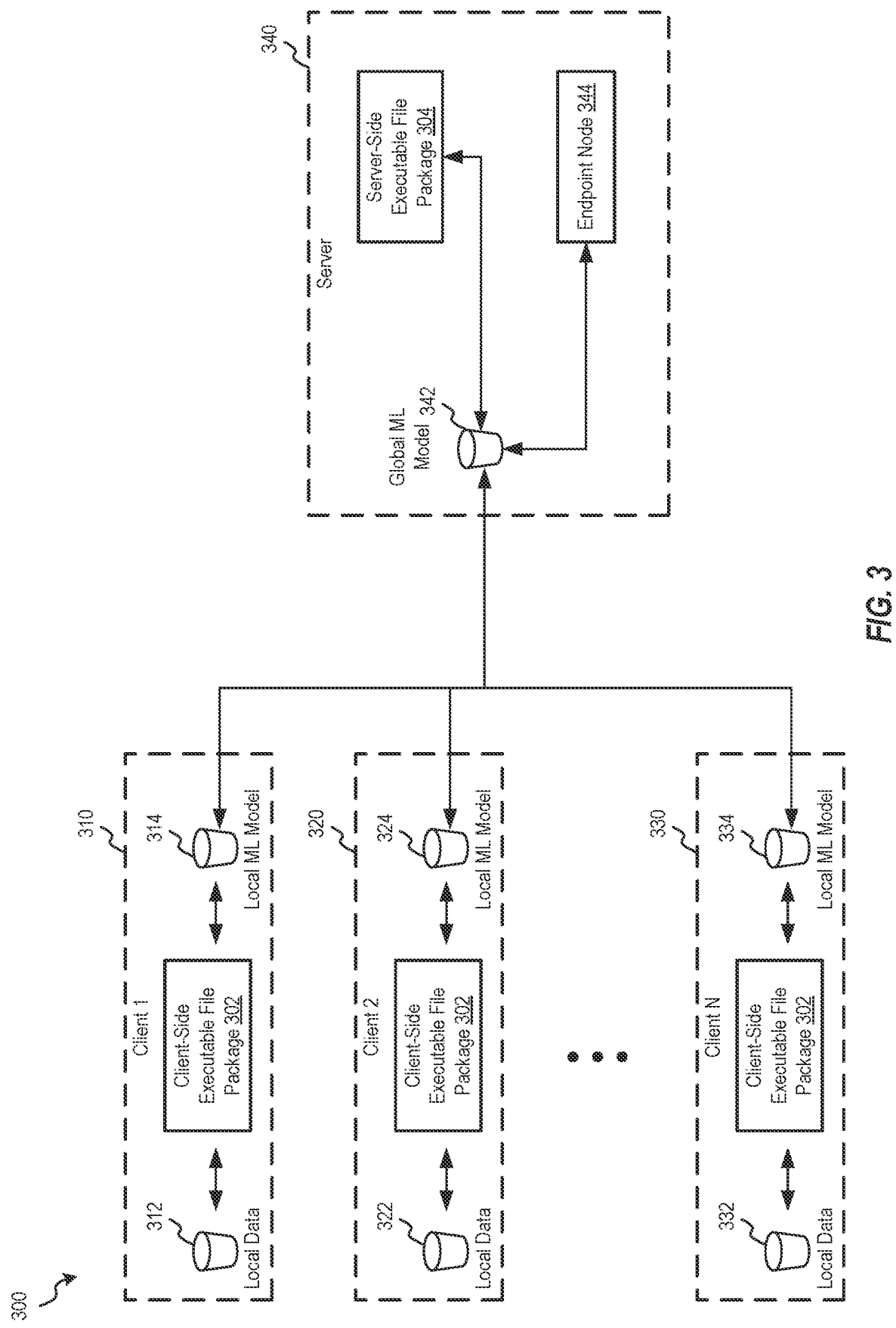
FIG. 3 is a block diagram of an example of a system that supports a first type of cooperative training of ML models using distributed executable file packages according to one or more aspects.

Referring to FIG. 3, an example of a system that supports a first type of cooperative training of ML models using distributed executable file packages according to one or more aspects is shown as a system 300. In some implementations, the system 300 of FIG. 3 may include or correspond to the system 100 of FIG. 1 or the system 200 of FIG. 2 (or components thereof). As shown in FIG. 3, the system 300 includes a first client 310 ("Client 1"), a second client 320 ("Client 2"), an Nth client 330 ("Client N"), and a server 340. Although three clients are shown in FIG. 3, in other implementations the system 300 may include fewer than three or more than three clients. Each of the clients 310, 320, and 330 and the server 340 may include or correspond to a cloud (or cloud services partition) associated with the respective entity. Each of the clouds may include one or more storage locations (e.g., memories, databases, etc.) and one or more processing resources that can receive and execute executable file packages. The entity-specific clouds may be maintained by a single service provider or by multiple service providers. Although described as clouds, in other implementations, the clients 310, 320, and 330 and the server 340 may include or correspond to different types of distributed or networked computing resources, or the clients 310, 320, and 330 and the server 340 may include or correspond to respective devices connected via one or more networks. In some implementations, the first type of cooperating training supported by the system 300 is federated learning.

Each client may include two storage locations for storing local data and local ML models. To illustrate, the first client 310 may include a first storage location 312 and a second storage location 314, the second client 320 may include a third storage location 322 and a fourth storage location 324, and the Nth client 330 may include a fifth storage location 332 and a sixth storage location 334. The first storage location 312 may be configured to store private client data of the first client 310 that is to be used as training data and the second storage location 314 may be configured to store local ML models for training by the first client 310. Storage locations 322, 324, 332, and 334 may be similarly configured for the second client 320 and the Nth client 330. None of the storage locations 312, 314, 322, 324, 332, or 334 are accessible to any other client. Each client may receive and execute a client-side executable file package 302 to cause the respective client to perform the cooperative training of ML models described herein. The client-side executable file package 302 may include a configuration file, one or more ML libraries, one or more pre-processing files or libraries, an operating system, one or more scripts, other files or data, or a combination thereof. In some implementations, the client-side executable file package 302 may include or correspond to a Docker container.

The server 340 may include a storage location 342 that is configured to store ML models for use by the clients. Because the ML models are the same for each client in federated learning, the ML models may be referred to as global ML models. The storage location 342 may be accessible to the clients 310, 320, and 330. The server 340 may receive and execute a server-side executable file package 304 to cause the server 340 to perform the cooperative training of ML models described herein. The server-side executable file package 304 may include a configuration file, one or more ML libraries, an operating system, one or more scripts, other files or data, or a combination thereof. In some implementations, the server-side executable file package 304 may include or correspond to a Docker container. In some implementations, the server 340 includes or supports an endpoint node 344 that can be configured to provide ML services based on a trained ML model.

Execution of the client-side executable file package 302 and the server-side executable file package 304 may cause the clients 310, 320, and 330 and the server 340 to collaborate to train an ML model to predict whether a financial transaction is fraudulent. In federated learning, the server 340 initializes a global ML model (e.g., an initial ML model) and shares copies of the model with participating clients. Although all three of the clients 310, 320, and 330 are described as participating, in other implementations, some clients may participate in training the ML model and in receiving ML services, some clients may subscribe to the ML services without participating in the training, and some clients may participate in the training (e.g., for a fee or other incentive) but not subscribe to the ML services. Each participating client trains a respective local ML model using its local dataset of financial transactions data, which may be private or confidential. The trained local ML models are collected and aggregated by the server 340 to construct a new global ML model (e.g., an aggregated ML model) for deployment. To illustrate, execution of the server-side executable file package 304 may cause the server 340 to generate and store copies of an initial ML model parameter set at the storage location 342. The server-side executable file package 304 may be configured with read and write access to the storage location 342 and may include one or more ML libraries and any other files needed to support initialization, aggregation, and validation of ML models using federated learning. Storing the copies of the initial ML model parameter set at the storage location 342 may provide the initial ML model parameter set to each of the multiple participating clients.

Execution of the client-side executable file package 302 by the clients 310, 320, and 330 may cause the clients 310, 320, and 330 to collaboratively train the initial ML model. In some implementations, the client-side executable file package 302 includes an operating system for running on the client cloud services to enable, in combination with scripts, ML libraries, and other files, retrieval of the initial ML model parameter set, retrieval of client data, training of a local ML model using the client data, and communication of the trained local ML model to the server 340. Additionally or alternatively, the client-side executable file package 302 may include a configuration file that designates the locations and configurations of the first storage location 312 and the second storage location 314. The first client 310 may execute the client-side executable file package 302 to participate in the collaborative training of an ML model for fraud prediction. To illustrate, execution of the client-side executable file package 302 may cause the first client 310 to obtain a copy of the initial ML model parameter set from the storage location 342 and store the copy at the second storage location 314. For example, the client-side executable file package 302 may provide the first client 310 with read and write access to the storage location 342, and the first client 310 may read (e.g., pull) a copy of the initial ML model parameter set from the storage location 342 and store the parameter set as a local ML model parameter set at the second storage location 314. Alternatively, if the server 340 is granted write access to storage locations at the clients for storing local ML models, the server 340 may store a copy of the initial ML model parameter set as a local ML model parameter set at the second storage location 314. Execution of the client-side executable file package 302 may further cause the first client 310 may retrieve (e.g., pull or prompt the client to provide) client-specific financial transaction data, such as from a client device or database, and store the financial transaction data at the first storage location 312.

In some implementations, the client-side executable file package 302 includes one or more pre-processing files or libraries, and execution of the client-side executable file package 302 may cause the first client 310 to selectively perform one or more pre-processing operations on the client data. The one or more pre-processing operations may be configured to eliminate duplicate or null features, add one or more missing feature values, convert the client data to a common format, extract one or more particular features, perform other types of pre-processing, or a combination thereof. To illustrate, the first client 310 may determine whether a format of the client data stored at the first storage location 312 matches a common format of training data for the ML models. If the format of the client data matches the common format (or a similarity between the data satisfies a threshold), the first client 310 may perform relatively minor pre-processing, or no pre-processing, on the client data. The relatively minor pre-processing may include adding a few missing feature values, such as by extrapolating a missing value of a particular feature based on other values of the same feature or the like, removing duplicate values, or the like, or feature extraction such as extracting a values of a set of preconfigured features from the client data. If the format of the client data does not match the common format (or the similarity between the data fails to satisfy the threshold), the first client 310 may perform one or more pre-processing operations to convert the client data to the common format. For example, the first client 310 may perform operations to discard features that are not included in the common format, change formatting of the client data (e.g., data types, numbers of digits or characters, etc.), estimate values for one or more missing features in the common format, or the like. Pre-processing the client data prior to training an ML model may enable aggregation of the resulting trained ML models from different clients for generation of a global ML model that can be used by clients that have different data formats. Additionally, configuring the client-side executable file package 302 to control the pre-processing frees the clients from performing their own pre-processing on their client data, which may require additional software or a trained data technician.

Execution of the client-side executable file package 302 may cause the first client 310, after optionally pre-processing the client data stored at the first storage location 312, to provide the client data as training data to a local ML model implemented based on the local ML model parameter set stored at the second storage location 314. For example, the client data may be divided into training data, test data, and validation data, and the various data may be used to train a local ML model, such as to have a particular accuracy, for a particular amount of time, for a particular number of epochs, or based on any other training metric. The training data may include feature data labeled with whether the features correspond to a fraudulent financial transaction or a legitimate financial transaction, and the features may include or indicate transaction history, a billing address, a user identifier, a signature, an available credit line, a last transaction location, a transaction time, an amount of transactions during a threshold time period, other financial information, or a combination thereof. The client data from which the features are extracted may include text data, image data, audio data, or a combination thereof. Training the local ML model may include tuning parameters or hyperparameters of the local ML model until the training is complete, resulting in a trained local ML model parameter set. The first client 310 may store the trained local ML model parameter set at the second storage location 314. Because the trained local ML model parameter set indicates parameters of an ML model and not the training data used to train the ML model, the trained local ML model parameter set can be shared with the server 340 without exposing the private client data of the first client 310.

Similar operations may be performed by the second client 320 and the Nth client 330. For example, execution of the client-side executable file package 302 may cause the second client 320 to retrieve and store a copy of the initial ML model parameter set at the fourth storage location 324, to implement and train a local ML model using client data stored at the third storage location 322 (after optionally pre-processing the client data), and storing a trained local ML model parameter set at the fourth storage location 324. As another example, execution of the client-side executable file package 302 may cause the Nth client 330 to retrieve and store a copy of the initial ML model parameter set at the sixth storage location 334, to implement and train a local ML model using client data stored at the fifth storage location 332 (after optionally pre-processing the client data), and storing a trained local ML model parameter set at the sixth storage location 334.

After the local ML models are trained by the clients 310, 320, and 330, execution of the server-side executable file package 304 may cause the server 340 to obtain the trained local ML model parameter sets for aggregation. For example, if the server 340 has read access to the respective client storage locations, execution of the server-side execution file package 304 may cause the server 340 to retrieve (e.g., pull or read) a first trained ML model parameter set from the second storage location 314, a second trained ML model parameter set from the fourth storage location 324, and a third trained ML model parameter set from the sixth storage location 334. Alternatively, if the clients 310, 320, and 330 have write access to the storage location 342, the clients 310, 320, and 330 may provide (e.g., transmit or write) the respective trained ML model parameter set to the storage location 342. After obtaining the trained ML model parameter sets, the server 340 may aggregate the multiple trained ML model parameter sets to construct a fraud prediction model (e.g., a global aggregated ML model). For example, the server 340 may perform averaging, weighted averaging, or other aggregation of the parameters in the parameter sets to construct the global aggregated ML model, as described above with reference to FIG. 1. The server-side executable file package 304 may include the ML libraries, files, and other information described above to enable the server 340 to perform ML model initialization, aggregation, and validation/evaluation. For example, the server 340 may store validation data and may use the validation data to validate (e.g., evaluate) the global aggregated ML model. Validation may include evaluating whether an accuracy of the global aggregated ML model matches a threshold when the validation data is provided as input data, and if the accuracy does not satisfy the threshold, providing copies of the global aggregated ML model parameter set to the clients 310, 320, and 330 for one or more iterations of local training, collection, aggregation, and validation, until the accuracy satisfies the threshold (or until another validation criteria is satisfied).

Execution of the server-side executable file package 304 may conclude with deployment of the fraud prediction model (e.g., the global aggregated ML model) to the endpoint node 344 or at least some of the clients 310, 320, or 330. In some implementations, the server 340 deploys the fraud prediction model by uploading a fraud predictor parameter set (e.g., corresponding to the global aggregated ML model parameter set) to the endpoint node 344 for implementation of a fraud prediction model at the endpoint node 344. For example, uploading the fraud predictor parameter set may configure the endpoint node 344 to receive a fraud prediction request from one of the clients 310, 320, or 330, or a user device (e.g., a client that subscribes to the ML service but that does not participate in the training process) and to transmit a prediction to the requester. The prediction indicates whether a financial transaction indicated by the fraud prediction request is predicted to be fraudulent. In some implementations, the requester may execute the client-side executable file package 302 (or a user-side executable file package that includes a subset of the client-side executable file package 302) to cause the requester to generate and transmit the fraud prediction request based on private data, optionally after pre-processing the private data, as described with reference to FIG. 1. Additionally or alternatively, the server 340 may deploy the fraud prediction model by storing copies of the fraud predictor parameter set at the storage location 342 for retrieval by one or more of the clients 310, 320, and 330 or by writing copies of the fraud predictor parameter set at the respective client-side storage locations configured for ML model storage (e.g., one or more of the second storage location 314, the fourth storage location 324, and the sixth storage location 334).

Figure 4:
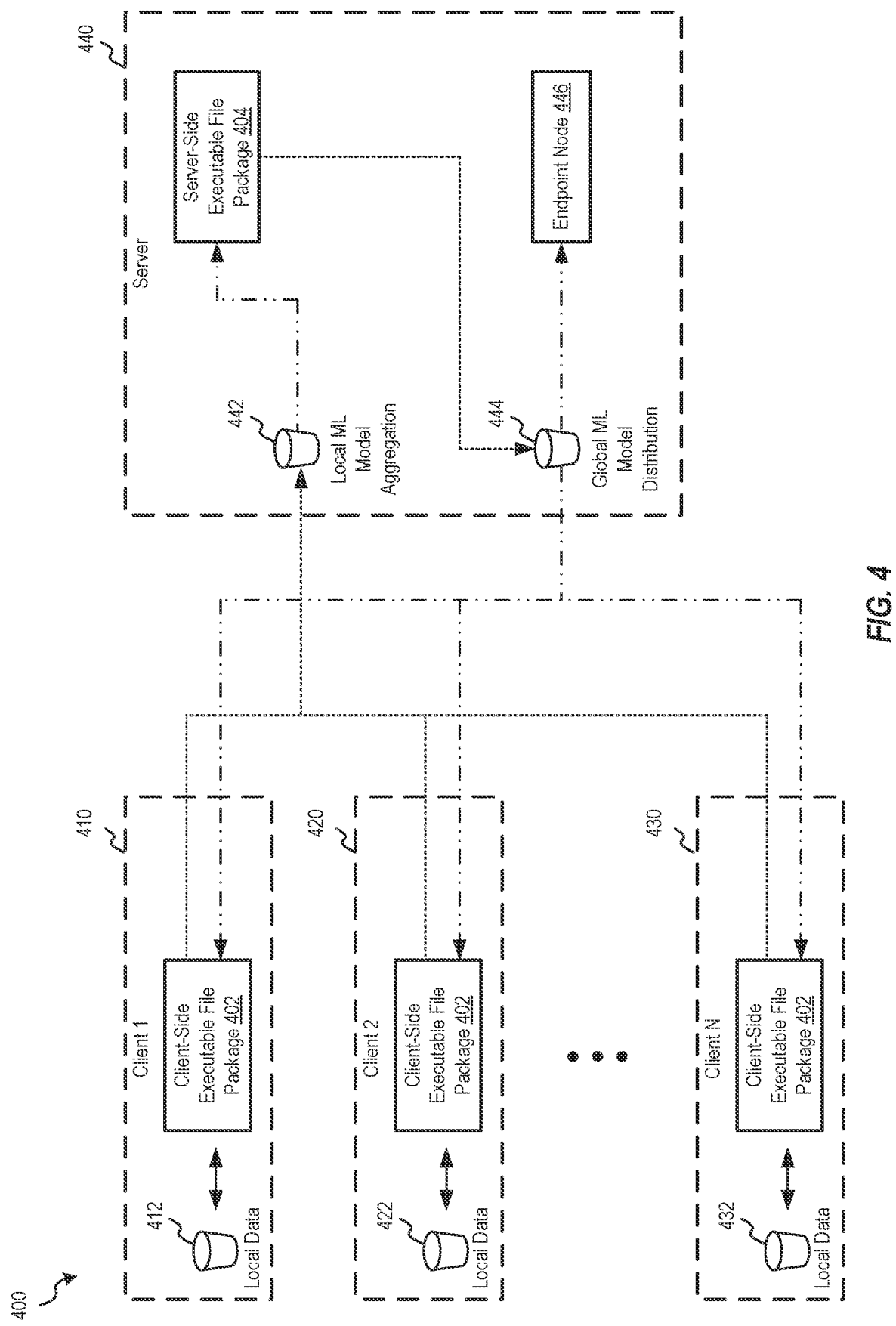
FIG. 4 is a block diagram of an example of a system that supports the first type of cooperative training of ML models with access controls according to one or more aspects.

Referring to FIG. 4, an example of a system that supports the first type of cooperative training of ML models with access controls according to one or more aspects is shown as a system 400. In some implementations, the system 400 of FIG. 4 may include or correspond to the system 100 of FIG. 1 or the system 200 of FIG. 2 (or components thereof). As shown in FIG. 4, the system 400 includes a first client 410 ("Client 1"), a second client 420 ("Client 2"), an Nth client 430 ("Client N"), and a server 440. Although three clients are shown in FIG. 4, in other implementations the system 400 may include fewer than three or more than three clients. Each of the clients 410, 420, and 430 and the server 440 may include or correspond to a cloud (or cloud services partition) associated with the respective entity. Each of the clouds may include one or more storage locations (e.g., memories, databases, etc.) and one or more processing resources that can receive and execute executable file packages. The entity-specific clouds may be maintained by a single service provider or by multiple service providers. Although described as clouds, in other implementations, the clients 410, 420, and 430 and the server 440 may include or correspond to different types of distributed or networked computing resources, or the clients 410, 420, and 430 and the server 440 may include or correspond to respective devices connected via one or more networks. In some implementations, the first type of cooperating training supported by the system 400 is federated learning.

Each client may include a storage location for storing local data. To illustrate, the first client 410 may include a first storage location 412 configured to store private client data of the first client 410 to be used as training data, the second client 420 may include a second storage location 422 configured to store private client data of the second client 420 to be used as training data, and the Nth client 430 may include a third storage location 432 configured to store private client data of the Nth client 430 to be used as training data. None of the storage locations 412, 422, or 432 are accessible to any other client. Each client may receive and execute a client-side executable file package 402 to cause the respective client to perform the cooperative training of ML models described herein, similar as to described with reference to FIG. 3. The server 440 may include an aggregation storage location 442 that is configured to store parameter sets corresponding to local ML models trained by the clients and a distribution storage location 444 that is configured to store parameter sets corresponding to global ML models to be distributed to the clients or to other entities. The server 440 may receive and execute a server-side executable file package 404 to cause the server 440 to perform the cooperative training of ML models described herein, similar to as described with reference to FIG. 3. In some implementations, the server 440 includes or supports an endpoint node 446 that can be configured to provide ML services based on a trained ML model.

Execution of the client-side executable file package 402 and the server-side executable file package 404 may cause the clients 410, 420, and 430 and the server 440 to collaborate to train an ML model to predict whether a financial transaction is fraudulent, similar to as described with reference to FIG. 3. However, the system 400 may use fewer storage locations at the clients 410, 420, and 430 and an additional storage location at the server 440 by leveraging access controls. To illustrate, the clients 410, 420, and 430 may be granted write-only access to the aggregation storage location 442 and read-only access to the distribution storage location 444, the server-side executable file package 404 may be granted read-only access to the aggregation storage location 442 and write-only access to the distribution storage location 444, and the endpoint node 446 may be granted read-only access to the distribution storage location 444.

Execution of the client-side executable file package 402 by the clients 410, 420, and 430 and execution of the server-side executable file package 404 by the server 440 may cause the clients 410, 420, and 430 and the server 440 to participate in cooperative learning to train an ML model. During the cooperative learning, the server 440 may store copies of an initial ML model parameter set at the distribution storage location 444. Each of the clients 410, 420, and 440 may read a respective copy of the initial ML model parameter set from the storage location 444 and use respective client data to train a local ML model, as described with reference to FIG. 3, and each of the clients 410, 420, and 440 may write a respective trained local ML model parameter set at the aggregation storage location 442. The server 440 may read the trained local ML model parameter sets from the aggregation storage location 442 and aggregate the parameters to construct a fraud prediction model (e.g., a global aggregated ML model). After constructing the fraud prediction model, the server 440 write a fraud predictor parameter set corresponding to the fraud prediction model to the distribution storage location 444 for deployment to the endpoint node 446, one or more of the clients 410, 420, and 430, other clients or users, or a combination thereof. In this manner, the system 400 may be configured to perform federated learning without using storage locations at the clients 410, 420, and 430 that are accessible to the server 440.

Figure 5:
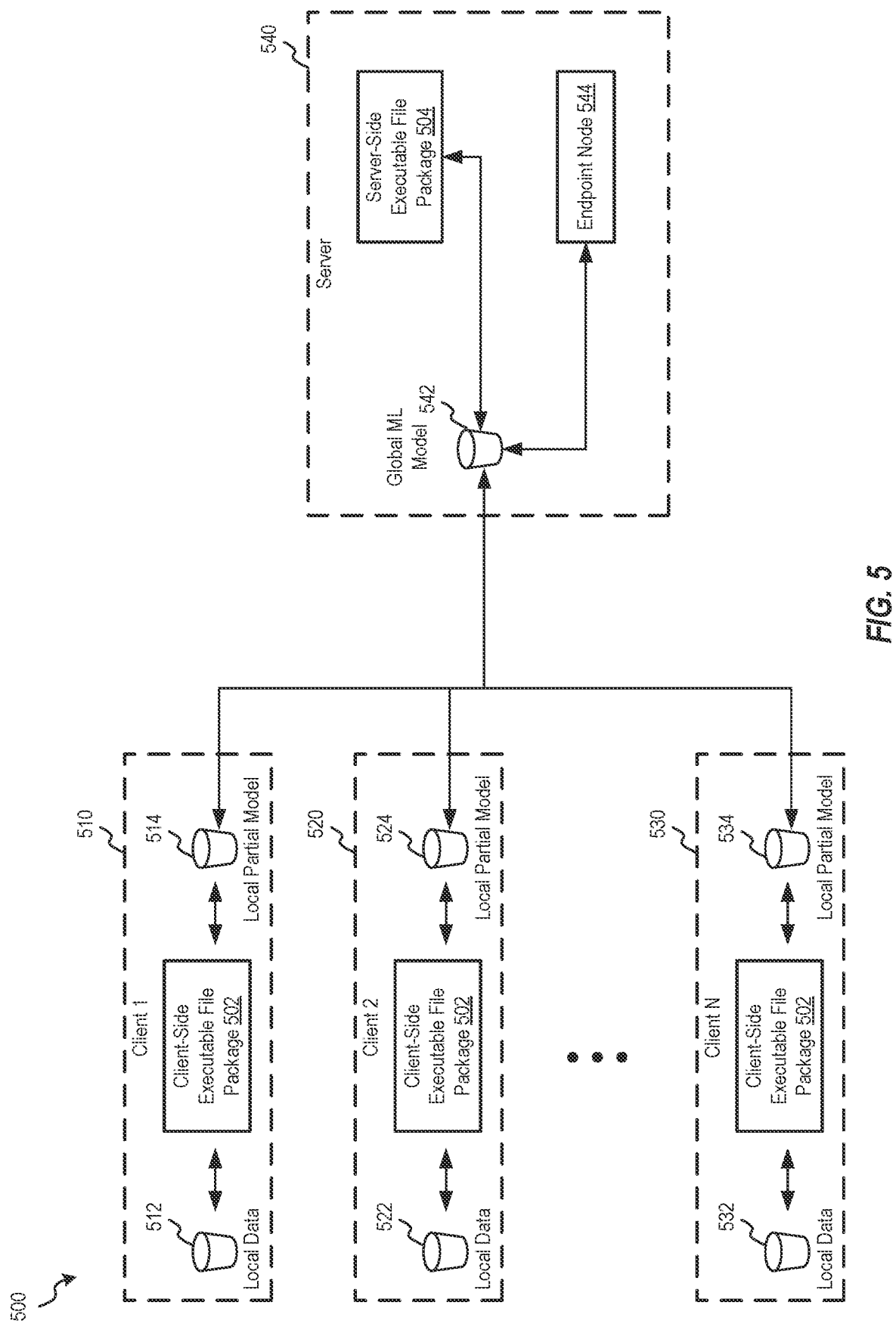
FIG. 5 is a block diagram of an example of a system that supports a second type and a third type of cooperative training of ML models using distributed executable file packages according to one or more aspects.

Referring to FIG. 5, an example of a system that supports a second type and a third type of cooperative training of ML models using distributed executable file packages according to one or more aspects is shown as a system 500. In some implementations, the system 500 of FIG. 5 may include or correspond to the system 100 of FIG. 1 or the system 200 of FIG. 2 (or components thereof). As shown in FIG. 5, the system 500 includes a first client 510 ("Client 1"), a second client 520 ("Client 2"), an Nth client 530 ("Client N"), and a server 540. Although three clients are shown in FIG. 5, in other implementations the system 500 may include fewer than three or more than three clients. Each of the clients 510, 520, and 530 and the server 540 may include or correspond to a cloud (or cloud services partition) associated with the respective entity. Each of the clouds may include one or more storage locations (e.g., memories, databases, etc.) and one or more processing resources that can receive and execute executable file packages. The entity-specific clouds may be maintained by a single service provider or by multiple service providers. Although described as clouds, in other implementations, the clients 510, 520, and 530 and the server 540 may include or correspond to different types of distributed or networked computing resources, or the clients 510, 520, and 530 and the server 540 may include or correspond to respective devices connected via one or more networks. In some implementations, the system 500 may support split learning (e.g., the second type of cooperating training) or federated split learning (e.g., the third type of cooperative training).

Each client may include two storage locations for storing local data and local ML models. To illustrate, the first client 510 may include a first storage location 512 and a second storage location 514, the second client 520 may include a third storage location 522 and a fourth storage location 524, and the Nth client 530 may include a fifth storage location 532 and a sixth storage location 534. The first storage location 512 may be configured to store private client data of the first client 510 that is to be used as training data and the second storage location 514 may be configured to store local ML models for training by the first client 510. Storage locations 522, 524, 532, and 534 may be similarly configured for the second client 520 and the Nth client 530. None of the storage locations 512, 514, 522, 524, 532, or 534 are accessible to any other client. Each client may receive and execute a client-side executable file package 502 to cause the respective client to perform the cooperative training of ML models described herein. The client-side executable file package 502 may include a configuration file, one or more ML libraries, one or more pre-processing files or libraries, an operating system, one or more scripts, other files or data, or a combination thereof. In some implementations, the client-side executable file package 502 may include or correspond to a Docker container.

The server 540 may include a storage location 542 that is configured to store partial ML models for use by the clients. In split learning implementations, the partial ML models are the same for each client. In federated split learning implementations, the partial ML models may be different for some (or all) of the clients. The storage location 542 may be accessible to the clients 510, 520, and 530. The server 540 may receive and execute a server-side executable file package 504 to cause the server 540 to perform the cooperative training of ML models described herein. The server-side executable file package 504 may include a configuration file, one or more ML libraries, an operating system, one or more scripts, other files or data, or a combination thereof. In some implementations, the server-side executable file package 504 may include or correspond to a Docker container. In some implementations, the server 540 includes or supports an endpoint node 544 that can be configured to provide ML services based on a trained ML model.

Execution of the client-side executable file package 502 and the server-side executable file package 504 may cause the clients 510, 520, and 530 and the server 540 to collaborate to train an ML model to predict whether a financial transaction is fraudulent, similar to as described with reference to FIG. 3. However, in split learning and federated split learning, the server 540 initializes a global ML model (e.g., an initial ML model) and splits the initial ML model into one or more client-side partial ML models and one or more server-side partial ML models. For split learning, the server 540 may split the initial ML model into a single client-side partial ML model (e.g., a common client-side partial ML model) and a single server-side partial ML model. For federated split learning, the server 540 may perform an individualized split for at least some of the clients, resulting in multiple unique client-side partial ML models (e.g., multiple individual client-side partial ML models) and multiple unique server-side partial ML models (e.g., multiple individual server-side partial ML models). For split learning and federated split learning, the server 540 shares the client-side ML model(s) with participating clients. Each participating client trains a respective local partial ML model using its local dataset of financial transactions data, which may be private or confidential. The training includes providing output data to the server 540 for training of corresponding server-side partial ML models, and receipt of gradient data for training of the local partial ML models, as further described with reference to FIG. 1, to result in trained local partial ML models at the clients 510, 520, and 530 and trained server-side partial ML models at the server 540. The trained local partial ML models are collected and aggregated by the server 540 to construct a new global ML model (e.g., an aggregated ML model) for deployment.

Execution of the client-side executable file package 502 by the clients 510, 520, and 530 may cause the clients 510, 520, and 530 to collaboratively train respective partial ML models. To illustrate, execution of the client-side executable file package 502 may cause the first client 510 to obtain a copy of a global partial ML model parameter set (e.g., in split learning implementations) or a client-specific partial ML model parameter set (e.g., in federated split learning implementations) from the storage location 542 and store the partial ML model parameter set at the second storage location 514. For example, the client-side executable file package 502 may provide the first client 510 with read and write access to the storage location 542, and the first client 510 may read (e.g., pull) the partial ML model parameter set from the storage location 542 and store the parameter set as a local partial ML model parameter set at the second storage location 514. Alternatively, if the server 540 is granted write access to storage locations at the clients for storing local partial ML models, the server 540 may write the partial ML model parameter set as a local partial ML model parameter set at the second storage location 514. Execution of the client-side executable file package 502 may further cause the first client 510 may retrieve (e.g., pull or prompt the client to provide) client-specific financial transaction data, such as from a client device or database, and store the financial transaction data at the first storage location 512.

Execution of the client-side executable file package 502 may cause the first client 510, after optionally pre-processing the client data stored at the first storage location 512 as described with reference to FIG. 3, to provide the client data as training data to a local partial ML model implemented based on the local partial ML model parameter set stored at the second storage location 514. Training the local partial ML model may include generating output data (e.g., smash data) for use by the server 540 in training a corresponding server-side partial ML model, receiving gradient data generated during training of the server-side partial ML model, using the gradient data in the training of the local partial ML model, and providing additional output data (e.g., additional smash data) to the server 540, as well as providing a trained partial ML model parameter set to the server 540. For example, the various output data generated during training of the local partial ML model by the first client 510 and the trained partial ML model parameter set may be stored at the second storage location 514. Because the output data and the trained partial ML model parameter set do not reveal the training data used to train the local partial ML model, the output data can be shared with the server 540 without exposing the private client data of the first client 510.

Similar operations may be performed by the second client 520 and the Nth client 530. For example, execution of the client-side executable file package 502 may cause the second client 520 to retrieve and store a partial ML model parameter set at the fourth storage location 524, to implement and train a local partial ML model using client data stored at the third storage location 522 (after optionally pre-processing the client data), and to store output data generated during training of the local partial ML model a trained partial ML model parameter set at the fourth storage location 524. As another example, execution of the client-side executable file package 502 may cause the Nth client 530 to retrieve and store a partial ML model parameter set at the sixth storage location 534, to implement and train a local partial ML model using client data stored at the fifth storage location 532 (after optionally pre-processing the client data), and to store output data generated during training of the local partial ML model and a trained partial ML model parameter set at the sixth storage location 534. Gradient data may be written by the server 540 to the fourth storage location 524 and the sixth storage location 534 for use in training the respective partial ML models at the second client 520 and the Nth client 530, respectively.

During training of the partial ML models at the clients 510, 520, and 530, execution of the server-side executable file package 504 may cause the server 540 to retrieve the output data stored at the storage location 542 and use the output data to train respective server-side partial ML models for each of the clients 510, 520, and 530. During training of the server-side partial ML models, the server 540 may write gradient data to the storage locations of the clients 510, 520, and 530. After the client-side partial ML models and the server-side partial ML models are trained, the server 540 may obtain the trained partial ML model parameter sets from the storage location 542 for combining with the corresponding trained server-side partial ML model parameter sets to construct trained ML model parameter sets (e.g., full ML models) that correspond to the clients 510, 520, and 530. After combining the client-side and server-side partial ML model parameter sets, the server 540 may aggregate the multiple trained ML model parameter sets to construct a fraud prediction model (e.g., a global aggregated ML model). For example, the server 540 may perform averaging, weighted averaging, or other aggregation of the parameters in the parameter sets to construct the global aggregated ML model, as described above with reference to FIGS. 1 and 3.

Execution of the server-side executable file package 504 may conclude with deployment of the fraud prediction model (e.g., the global aggregated ML model) to the endpoint node 544 or at least some of the clients 510, 520, or 530. In some implementations, the server 540 deploys the fraud prediction model by uploading a fraud predictor parameter set (e.g., corresponding to the global aggregated ML model parameter set) to the endpoint node 544 for implementation of a fraud prediction model at the endpoint node 544. For example, uploading the fraud predictor parameter set may configure the endpoint node 544 to receive a fraud prediction request from one of the clients 510, 520, or 530, or a user device (e.g., a client that subscribes to the ML service but that does not participate in the training process) and to transmit a prediction to the requester. The prediction indicates whether a financial transaction indicated by the fraud prediction request is predicted to be fraudulent. In some implementations, the requester may execute the client-side executable file package 502 (or a user-side executable file package that includes a subset of the client-side executable file package 502) to cause the requester to generate and transmit the fraud prediction request based on private data, optionally after pre-processing the private data, as described with reference to FIG. 1. Additionally or alternatively, the server 540 may deploy the fraud prediction model by storing copies of the fraud predictor parameter set at the storage location 542 for retrieval by one or more of the clients 510, 520, and 530 or by writing copies of the fraud predictor parameter set at the respective client-side storage locations configured for ML model storage (e.g., one or more of the second storage location 514, the fourth storage location 524, and the sixth storage location 534).

Figure 6:
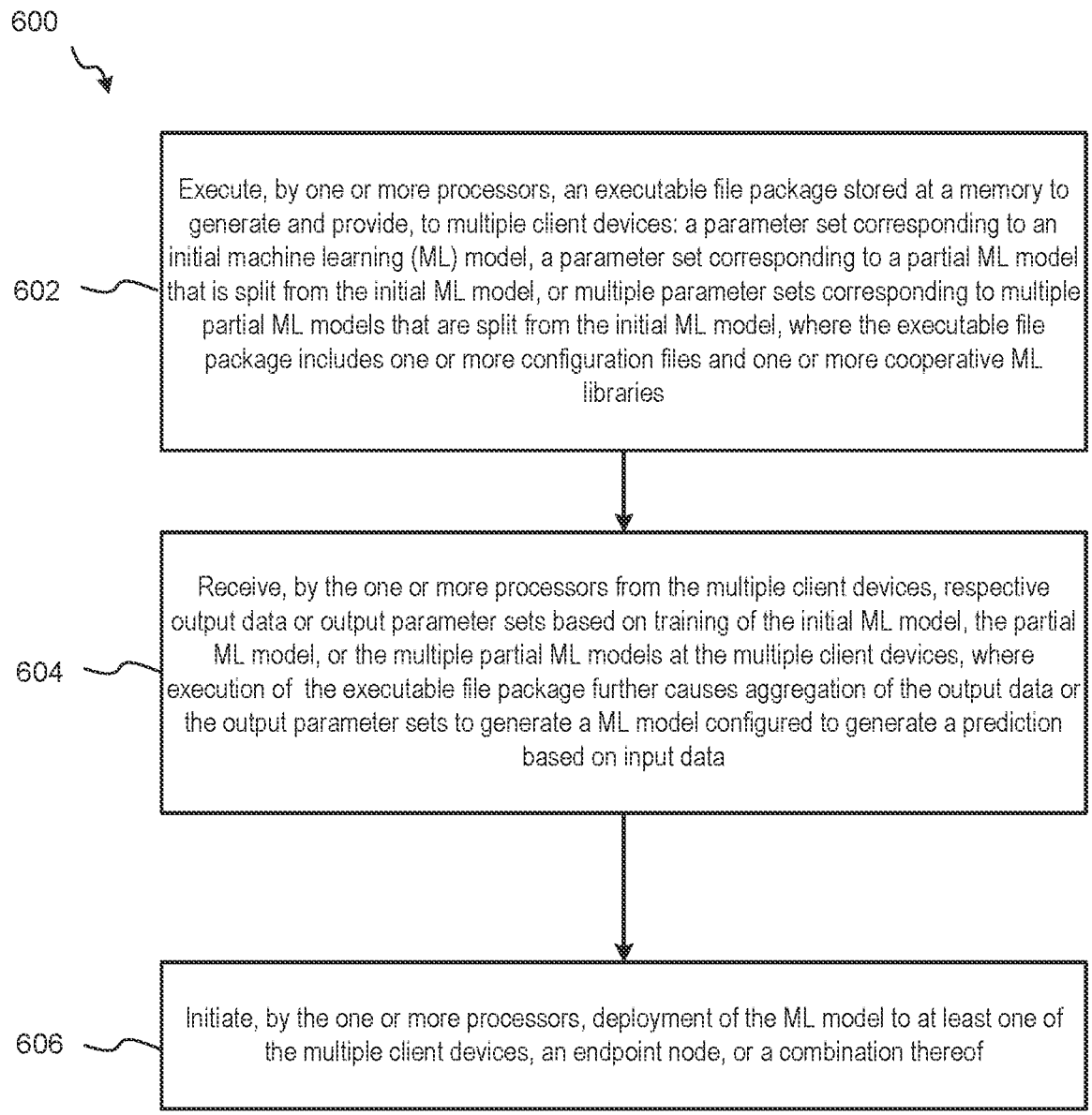
FIG. 6 is a flow diagram illustrating an example of a method for cooperative training, by a service provider, of ML models using distributed executable file packages according to one or more aspects.

Referring to FIG. 6, a flow diagram of an example of a method for cooperative training, by a service provider, of ML models using distributed executable file packages according to one or more aspects is shown as a method 600. In some implementations, the operations of the method 600 may be stored as instructions that, when executed by one or more processors (e.g., the one or more processors of a server), cause the one or more processors to perform the operations of the method 600. In some implementations, the method 600 may be performed by a computing device, such as the server 102 of FIG. 1 (e.g., a computing device configured for providing cloud-based machine learning services), the server 202 of FIG. 2, the server 340 of FIG. 3, the server 440 of FIG. 4, the server 540 of FIG. 5, or a combination thereof.

The method 600 includes executing an executable file package stored at a memory to generate and provide, to multiple client devices, a parameter set corresponding to an initial ML model, a parameter set corresponding to a partial ML model that is split from the initial ML model, or multiple parameter sets corresponding to multiple partial ML models that are split from the initial ML model, at 602. The executable file package includes one or more configuration files and one or more cooperative ML libraries. For example, the executable file package may include or correspond to the executable file package 110 of FIG. 1, and the parameter set or the multiple parameter sets may include or correspond to the ML model parameter sets 160 of FIG. 1. The method 600 includes receiving, from the multiple client devices, respective output data or output parameter sets based on training of the initial ML model, the partial ML model, or the multiple partial ML models at the multiple client devices, at 604. Execution of the executable file package further causes aggregation of the output data or the output parameter sets to generate a ML model configured to generate a prediction based on input data. For example, the output data or output parameter sets may include or correspond to the first training output 170 and the Nth training output 172 of FIG. 1, and the ML model configured to generate the prediction may include or correspond to the aggregated ML model parameter set 120 of FIG. 1.

The method 600 includes initiating deployment of the ML model to at least one of the multiple client devices, an endpoint node, or a combination thereof, at 606. For example, a fraud detection model may be provided to the clients or deployed for implementation at an endpoint node, as further described with reference to FIGS. 3-5.

In some implementations, receiving the output data or the output parameter sets includes retrieving, from a first service provider-side storage location accessible to the multiple client devices, the output data or the output parameter sets, and deploying the ML model includes storing a finalized parameter set corresponding to the ML model at a second service provider-side storage location that is accessible to at least one of the multiple client devices or transmitting the finalized parameter set to the endpoint node for supporting the ML model at the endpoint node. For example, the first service provider-side storage location may include or correspond to the aggregation storage location 442 of FIG. 4, and the second service provider-side storage location may include or correspond to the distribution storage location 444 of FIG. 4. Additionally or alternatively, executing the executable file package may apply one or more weights to the output parameter sets or the output data prior to aggregation of the output parameter sets or the output data, and the one or more weights are based on processing resources available at a client device from which a corresponding output parameter set or output data is received, an amount of client data used during training at the client device, a priority associated with the client device, or a combination thereof. For example, the one or more weights may include or correspond to the weights 122 of FIG. 1.

In some implementations, the ML model is trained to predict whether a financial transaction is fraudulent based on input financial data, and the input financial data indicates a transaction history, a billing address, an available credit line, a last transaction location, a transaction time, an amount of transactions during a threshold time period, or a combination thereof. For example, the ML model corresponding to the aggregated ML model parameter set 120 of FIG. 1 may be trained to predict whether a financial transaction is fraudulent, and the request data 152 of FIG. 1 may include financial data indicating a financial transaction. In some such implementations, deploying the ML model to the endpoint node configures the endpoint node to receive a fraud prediction request from a user device and to transmit, to the user device, a prediction whether the fraud prediction request represents a fraudulent financial transaction. For example, the endpoint node 344 of FIG. 3, the endpoint node 446 of FIG. 4, or the endpoint node 544 of FIG. 5 may be configured to provide predictions of whether financial transactions are fraudulent based on requests from user devices, such as the user device 150 of FIG. 1.

In some implementations, the executable file package includes a Docker container. For example, the executable file package 110 of FIG. 1 may include or correspond to a Docker container. Additionally or alternatively, execution of the executable file package may cause providing of the parameter set corresponding to the initial ML model to each of the multiple client devices and aggregation of the output parameter sets received from the multiple client devices to generate the ML model. For example, the ML model parameter sets 160 of FIG. 1 may include copies of the initial ML model parameter set 112 of FIG. 1, and the first training output 170 and the Nth training output 172 of FIG. 1 may include trained ML model parameter sets. In some other implementations, execution of the executable file package may cause splitting the initial ML model to create the partial ML model and a second partial ML model, providing the parameter set corresponding to the partial ML model to each of the multiple client devices, aggregating the output parameter sets received from the multiple client devices to generate an aggregated partial ML model, and aggregating the aggregated partial ML model and the second partial ML model to generate the ML model. For example, the partial ML model may correspond to the client partial ML model parameter set 116, the second partial ML model may correspond to the server partial ML model parameter set 118, and the first training output 170 and the Nth training output 172 may include respective trained partial ML model parameter sets (in addition to output data generated during training of the respective partial ML model).

In some implementations, execution of the executable file package may cause splitting the initial ML model to create the multiple partial ML models and multiple second partial ML models and providing a respective partial ML model of the multiple partial ML models to each of the multiple client devices. A first splitting of the initial ML model may generate a first pair of partial ML models that correspond to a first client device and a second splitting of the initial ML model may generate a second pair of partial ML models that correspond to a second client device. For example, the multiple partial ML models may correspond to the client partial ML model parameter sets 116 of FIG. 1, and the multiple second partial ML models may correspond to the server partial ML model parameter sets 118 of FIG. 1. In some such implementations, a first structural parameter associated the partial ML model of the first pair of partial ML models has a different value than a first structural parameter associated with the partial ML model of the second pair of partial ML models, and the first structural parameter includes a number of layers, a number of nodes in a particular layer, a number of hidden layers, a number of input nodes, a number of output nodes, a number of connections per node, or one or more weights, as further described with reference to FIG. 2. Additionally or alternatively, execution of the executable file package may cause providing of the output data received from the first client device as training data to a second partial ML model of the first pair of partial ML models to train a first combined ML model, providing of the output data received from the second client device as training data to a second partial ML model of the second pair of partial ML models to train a second combined ML model, and aggregation of the first combined ML model and the second combined ML model to generate the ML model. For example, with reference to FIG. 1, the first training output 170 may be used to train a first partial ML model of the server partial ML model parameter sets 118, the Nth training output 172 may be used to train a second partial ML model of the server partial ML model parameter sets 118, and the combined ML model parameter sets may be aggregated to construct the aggregated ML model parameter set 120. In some such implementations, execution of the executable file package may cause determination of first gradient data based on output of the second partial ML model of the first pair of partial ML models during training, providing the first gradient data to the first client device, receiving additional output data from the first client device, and providing the additional output data as further training data to the second partial ML model of the first pair of partial ML models. The additional output data may represent output of the partial ML model of the first pair of partial ML models during training based on the first gradient data. For example, the first gradient data may include or correspond to the first gradient data 180 of FIG. 1, and the additional output data may include or correspond to the first additional output 182 of FIG. 1.

As described above, the method 600 supports cooperative training of ML models and efficient use of available computing resources at multiple devices while preserving privacy of client data used to train the ML models. Additionally, by using distributed executable file package(s), the method 600 may enable existing cloud service providers that only support server-side ML model training to also support cooperative ML model training in a privacy-preserving manner. Thus, the method 600 provides a scalable, privacy-preserving method for cooperative learning that preserves privacy in an untrusted environment, as compared to conventional split-learning or federated learning techniques.

Figure 7:
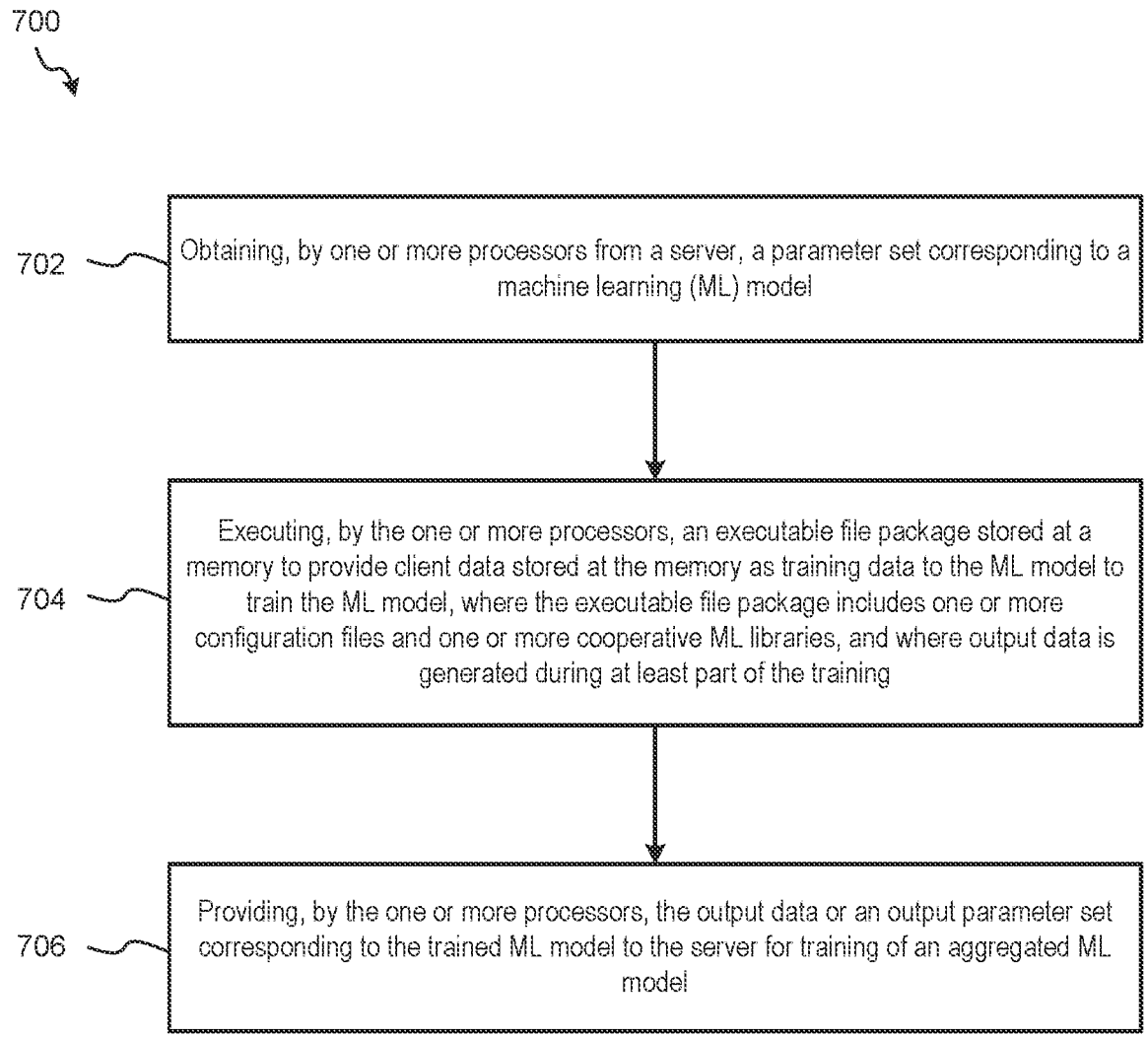
FIG. 7 is a flow diagram illustrating an example of a method for cooperative training, by a client, of ML models using distributed executable file packages according to one or more aspects.

Referring to FIG. 7, a flow diagram of an example of a method for cooperative training, by a client, of ML models using distributed executable file packages according to one or more aspects is shown as a method 700. In some implementations, the operations of the method 700 may be stored as instructions that, when executed by one or more processors (e.g., the one or more processors of a computing device), cause the one or more processors to perform the operations of the method 700. In some implementations, the method 700 may be performed by a computing device, such as the first client device 140 or the Nth client device 142 of FIG. 1 (e.g., a computing device of a client of a cloud-based ML services provider), the first client device 220, the second client device 230, or the Nth client device 240 of FIG. 2, the first client 310, the second client 320, or the Nth client 330 of FIG. 3, the first client 410, the second client 420, or the Nth client 430 of FIG. 4, the first client 510, the second client 520, or the Nth client 530 of FIG. 5, or a combination thereof.

The method 700 includes obtaining, from a server, a parameter set corresponding to a ML model, at 702. For example, the parameter set may include or correspond to the first parameter set 162 of FIG. 1. The method 700 includes executing an executable file package stored at a memory to provide client data stored at the memory as training data to the ML model to train the ML model, at 704. The executable file package may include one or more configuration files and one or more cooperative ML libraries. Output data may be generated during at least part of the training. For example, the executable file package may include or correspond to the executable file package 148 of FIG. 1, the client data may include or correspond to the first client data 144 of FIG. 1, and the output data may include or correspond to the first training output 170 of FIG. 1.

The method 700 includes providing the output data or an output parameter set corresponding to the trained ML model to the server for training of an aggregated ML model, at 706. For example, the output parameter set may include or correspond to the first training output 170 of FIG. 1, and the aggregated ML model may include or correspond to the aggregated ML model parameter set 120 of FIG. 1.

In some implementations, the executable file package further includes one or more pre-processing files or libraries, and execution of the executable file package further causes selective performance of one or more pre-processing operations on the client data prior to training the ML model. For example, pre-processing may be performed on client data to conform the client data to a common training data format or to perform other operations, as further described with reference to FIGS. 1 and 3. In some such implementations, the one or more pre-processing operations are configured to eliminate duplicate or null features, add one or more missing feature values, convert the client data to a common format, or a combination thereof.

In some implementations, the parameter set is obtained by retrieving the parameter set from a client-side storage location or by pulling the parameter set from a service provider-side storage location. For example, the client-side storage location may include or correspond to the second storage location 314 of FIG. 3 or the second storage location 514 of FIG. 5, and the service provider-side storage location may include or correspond to the storage location 342 of FIG. 3, the aggregation storage location 442 of FIG. 4, or the storage location 542 of FIG. 5. Additionally or alternatively, the ML model may include a common partial ML model associated with multiple other client devices or an initial ML model associated with multiple other client devices, and the output parameter set may be provided to the server. For example, with reference to FIG. 1, the first parameter set 162 may include the initial ML model parameter set 112 or the client partial ML model parameter set 116, and the first training output 170 may include a trained ML model parameter set.

In some implementations, the ML model includes an individual partial ML model and the output data is provided to the server. For example, with reference to FIG. 1, the first parameter set may be a first partial ML model parameter set of the client partial ML model parameter sets 116, and the first training output 170 may include output data and a trained ML model parameter set. In some such implementations, the method 700 further includes receiving gradient data from the server, the gradient data output during training of a second partial ML model based on the output data. Execution of the executable file package may further cause providing of the gradient data as further training data to the ML model, and the method 700 may also include providing additional output data generated during further training of the ML model to the server. For example, the gradient data may include or correspond to the first gradient data 180 of FIG. 1, and the additional output data may include or correspond to the first additional output 182 of FIG. 1.

As described above, the method 700 supports cooperative training of ML models and efficient use of available computing resources at multiple devices while preserving privacy of client data used to train the ML models. Additionally, by using distributed executable file package(s), the method 700 may enable clients that do not employ computer programmers or data scientists to participate in the cooperative training. Thus, the method 700 provides a scalable, privacy-preserving method for cooperative learning that preserves privacy in an untrusted environment, as compared to conventional split-learning or federated learning techniques.

It is noted that other types of devices and functionality may be provided according to aspects of the present disclosure and discussion of specific devices and functionality herein have been provided for purposes of illustration, rather than by way of limitation. It is noted that the operations of the method 600 of FIG. 6 and the method 700 of FIG. 7 may be performed in any order, or that operations of one method may be performed during performance of another method, such as the method 600 of FIG. 6 including one or more operations of the method 700 of FIG. 7. It is also noted that the method 600 of FIG. 6 and the method 700 of FIG. 7 may also include other functionality or operations consistent with the description of the operations of the system 100 of FIG. 1, the system 200 of FIG. 2, the system 300 of FIG. 3, the system 400 of FIG. 4, or the system 500 of FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for cooperative training, by a service provider, of machine learning models using distributed executable file packages, the method comprising:
executing, by one or more processors, an executable file package stored at a memory to generate and provide, to multiple client devices:
multiple parameter sets corresponding to multiple partial ML models that are split from an initial ML model,
wherein execution of the executable file package comprises:
splitting the initial ML model to create the multiple partial ML models and multiple second partial ML models,
wherein a first splitting of the initial ML model generates a first pair of partial ML models that correspond to a first client device and a second splitting of the initial ML model generates a second pair of partial ML models that correspond to a second client device, and wherein each of the first splitting and the second splitting is based on at least one of: computing resources available at a corresponding client device, a size of client-specific data accessible to the corresponding client device or a priority associated with a client corresponding to the corresponding client device; and
providing a respective partial ML model of the multiple partial ML models to each of the multiple client devices; and
wherein the executable file package includes one or more configuration files and one or more cooperative ML libraries;
receiving, by the one or more processors from the multiple client devices, respective output data or output parameter sets based on training of the multiple partial ML models at the multiple client devices,
wherein execution of the executable file package further causes aggregation of the output data or the output parameter sets to generate a ML model configured to generate a prediction based on input data; and initiating, by the one or more processors, deployment of the ML model to at least one of the multiple client devices, an endpoint node, or a combination thereof.

2. The method of claim 1, wherein:
receiving the output data or the output parameter sets comprises retrieving, from a first service provider-side storage location accessible to the multiple client devices, the output data or the output parameter sets, and
deploying the ML model comprises storing a finalized parameter set corresponding to the ML model at a second service provider-side storage location that is accessible to at least one of the multiple client devices or transmitting the finalized parameter set to the endpoint node for supporting the ML model at the endpoint node.

3. The method of claim 1, wherein:
the ML model is trained to predict whether a financial transaction is fraudulent based on input financial data, and
the input financial data indicates a transaction history, a billing address, an available credit line, a last transaction location, a transaction time, an amount of transactions during a threshold time period, or a combination thereof.

4. The method of claim 3, wherein deploying the ML model to the endpoint node configures the endpoint node to receive a fraud prediction request from a user device and to transmit, to the user device, a prediction whether the fraud prediction request represents a fraudulent financial transaction.

5. The method of claim 1, wherein:
executing the executable file package applies one or more weights to the output parameter sets or the output data prior to aggregation of the output parameter sets or the output data, and
the one or more weights are based on processing resources available at a client device from which a corresponding output parameter set or output data is received, an amount of client data used during training at the client device, a priority associated with the client device, or a combination thereof.

6. A system for cooperative training, by a service provider, of machine learning models using distributed executable file packages, the system comprising:
a memory configured to store an executable file package, wherein the executable file package includes one or more configuration files and one or more cooperative machine learning (ML) libraries; and
one or more processors communicatively coupled to the memory, the one or more processors configured to:
execute the executable file package to cause the one or more processors to:
generate and provide, to multiple client devices:
multiple parameter sets corresponding to multiple partial ML models that are split from an initial ML model;
wherein execution of the executable file package causes the one or more processors to:
split the initial ML model to create the multiple partial ML models and multiple second partial ML models,
wherein a first splitting of the initial ML model generates a first pair of partial ML models that correspond to a first client device and a second splitting of the initial ML model generates a second pair of partial ML models that correspond to a second client device, and wherein each of the first splitting and the second splitting is based on at least one of: computing resources available at a corresponding client device, a size of client-specific data accessible to the corresponding client device or a priority associated with a client corresponding to the corresponding client device; and
provide a respective partial ML model of the multiple partial ML models to each of the multiple client devices; and
receive, from the multiple client devices, respective output data or output parameter sets based on training of the initial ML model, the partial ML model, or the multiple partial ML models at the multiple client devices,
wherein execution of the executable file package further causes the one or more processors to aggregate the output data or the output parameter sets to generate a ML model configured to generate a prediction based on input data; and
initiate deployment of the ML model to at least one of the multiple client devices, an endpoint node, or a combination thereof.

7. The system of claim 6, wherein the executable file package comprises a Docker container.

8. The system of claim 6, wherein:
a first structural parameter associated with the first pair of partial ML models has a different value than a first structural parameter associated with the second pair of partial ML models; and
each of the first structural parameters comprises a number of layers, a number of nodes in a particular layer, a number of hidden layers, a number of input nodes, a number of output nodes, a number of connections per node, or one or more weights.

9. The system of claim 6, wherein execution of the executable file package causes the one or more processors to:
provide the output data received from the first client device as training data to a second partial ML model of the first pair of partial ML models to train a first combined ML model;
provide the output data received from the second client device as training data to a second partial ML model of the second pair of partial ML models to train a second combined ML model; and
aggregate the first combined ML model and the second combined ML model to generate the ML model.

10. The system of claim 9, wherein execution of the executable file package causes the one or more processors to:
determine first gradient data based on output of the second partial ML model of the first pair of partial ML models during training;
provide the first gradient data to the first client device;
receive additional output data from the first client device, wherein the additional output data represents output of the partial ML model of the first pair of partial ML models during training based on the first gradient data; and
provide the additional output data as further training data to the second partial ML model of the first pair of partial ML models.

11. A device for cooperative training, by a client, of machine learning models using distributed executable file packages, the device comprising:

a memory configured to store client data and an executable file package,
wherein the executable file package includes one or more configuration files and one or more cooperative machine learning (ML) libraries; and
one or more processors communicatively coupled to the memory, the one or more processors configured to:
obtain, from a server, a parameter set corresponding to a ML model, wherein the ML model comprises an individual partial ML model generated based on at least one of: computing resources available at the device, a size of client-specific data accessible to the device or a priority associated with the client of the client device;
execute the executable file package to cause the one or more processors to provide the client data as training data to the ML model to train the ML model,
wherein output data is generated during at least part of the training; and
provide the output data or an output parameter set corresponding to the trained ML model to the server for training of an aggregated ML model.

12. The device of claim 11, wherein:
the executable file package further includes one or more pre-processing files or libraries, and
execution of the executable file package further causes the one or more processors to selectively perform one or more pre-processing operations on the client data prior to training the ML model.

13. The device of claim 12, wherein the one or more pre-processing operations are configured to eliminate duplicate or null features, add one or more missing feature values, convert the client data to a common format, or a combination thereof.

14. The device of claim 11, wherein the one or more processors are configured to obtain the parameter set by retrieving the parameter set from a client-side storage location or by pulling the parameter set from a service provider-side storage location.

15. The device of claim 11, wherein:
the one or more processors are further configured to receive gradient data from the server,
the gradient data is output during training of a second partial ML model based on the output data,
execution of the executable file package further causes the one or more processors to provide the gradient data as further training data to the ML model, and
provide additional output data generated during further training of the ML model to the server.

* * * * *